United States Patent
Kusashima et al.

(10) Patent No.: US 12,137,422 B2
(45) Date of Patent: Nov. 5, 2024

(54) COMMUNICATION DEVICE, INFORMATION PROCESSING DEVICE, COMMUNICATION METHOD, AND INFORMATION PROCESSING METHOD

(71) Applicant: Sony Group Corporation, Tokyo (JP)

(72) Inventors: Naoki Kusashima, Tokyo (JP); Ryota Kimura, Tokyo (JP); Ryo Sawai, Tokyo (JP); Kyoya Teramae, Kyoto (JP); Keiichi Mizutani, Kyoto (JP); Hiroshi Harada, Kyoto (JP)

(73) Assignee: SONY GROUP CORPORATION, Tokyo (JP)

( * ) Notice: Subject to any disclaimer, the term of this patent is extended or adjusted under 35 U.S.C. 154(b) by 335 days.

(21) Appl. No.: 17/611,911

(22) PCT Filed: Apr. 30, 2020

(86) PCT No.: PCT/JP2020/018348
§ 371 (c)(1),
(2) Date: Nov. 17, 2021

(87) PCT Pub. No.: WO2020/235326
PCT Pub. Date: Nov. 26, 2020

(65) Prior Publication Data
US 2022/0232481 A1    Jul. 21, 2022

(30) Foreign Application Priority Data
May 22, 2019    (JP) .................... 2019-096417

(51) Int. Cl.
*H04W 52/46*    (2009.01)
*H04W 52/10*    (2009.01)
(Continued)

(52) U.S. Cl.
CPC ......... *H04W 52/146* (2013.01); *H04W 52/10* (2013.01); *H04W 52/241* (2013.01); *H04W 52/243* (2013.01); *H04W 88/14* (2013.01)

(58) Field of Classification Search
CPC ..... H04W 52/24; H04W 16/28; H04W 52/04; H04W 52/38; H04W 52/46; H04W 84/18; H04W 72/541
See application file for complete search history.

(56) References Cited

U.S. PATENT DOCUMENTS

2013/0242771 A1    9/2013  Ohta
2019/0089515 A1    3/2019  Madhavan
(Continued)

FOREIGN PATENT DOCUMENTS

JP    2018-152720 A    9/2018
JP    2019-57763 A     4/2019
(Continued)

OTHER PUBLICATIONS

International Search Report and Written Opinion mailed on Aug. 18, 2020, received for PCT Application PCT/JP2020/01834, Filed on Apr. 30, 2020, 12 pages including English Translation.
(Continued)

*Primary Examiner* — Tu X Nguyen
(74) *Attorney, Agent, or Firm* — XSENSUS LLP

(57) ABSTRACT

A communication device includes: a communication unit that is allowed to simultaneously perform data transmission and data reception by using a same band; an acquisition unit that acquires information regarding self-interference generated at a time when the data transmission and the data reception are simultaneously performed by using the same band; and a communication control unit that performs control regarding the data transmission based on information regarding the self-interference or information from another
(Continued)

device generated based on the information regarding the self-interference.

17 Claims, 16 Drawing Sheets

(51) Int. Cl.
    *H04W 52/14*     (2009.01)
    *H04W 52/24*     (2009.01)
    *H04W 88/14*     (2009.01)

(56) References Cited

U.S. PATENT DOCUMENTS

| | | | |
|---|---|---|---|
| 2020/0052775 A1* | 2/2020 | Nam | H04L 5/14 |
| 2022/0191800 A1* | 6/2022 | Huang | H04W 52/10 |
| 2022/0191838 A1* | 6/2022 | Huang | H04W 52/143 |

FOREIGN PATENT DOCUMENTS

| | | | |
|---|---|---|---|
| WO | 2005/045555 A2 | 5/2005 | |
| WO | 2011/111113 A1 | 9/2011 | |
| WO | WO-2017063696 A1 * | 4/2017 | ............. H04B 1/525 |

OTHER PUBLICATIONS

LG Electronics., "Motivation for new SI: Study on Flexible and Full Duplex for NR", 3GPP TSG RAN Meeting #83, RP-190265, Mar. 18-21, 2019, 11 pages.
HTC., "In-band full duplexing in NR", 3GPP TSG RAN WG1 Meeting #86bis, R1-1610091, Oct. 10-14, 2016, pp. 1-5.
Vivo., "Solutions for UE Self-interference", 3GPP MG RAN WG1 Meeting#90, R1-1712872, Aug. 21-25, 2017, pp. 1-6.
LG Electronics., "Issues on multiplexing of WAN and D2D", 3GPP TSG RAN WG1 Meeting #76bis, R1-141354, Mar. 31-Apr. 4, 2014, pp. 1-10.

* cited by examiner

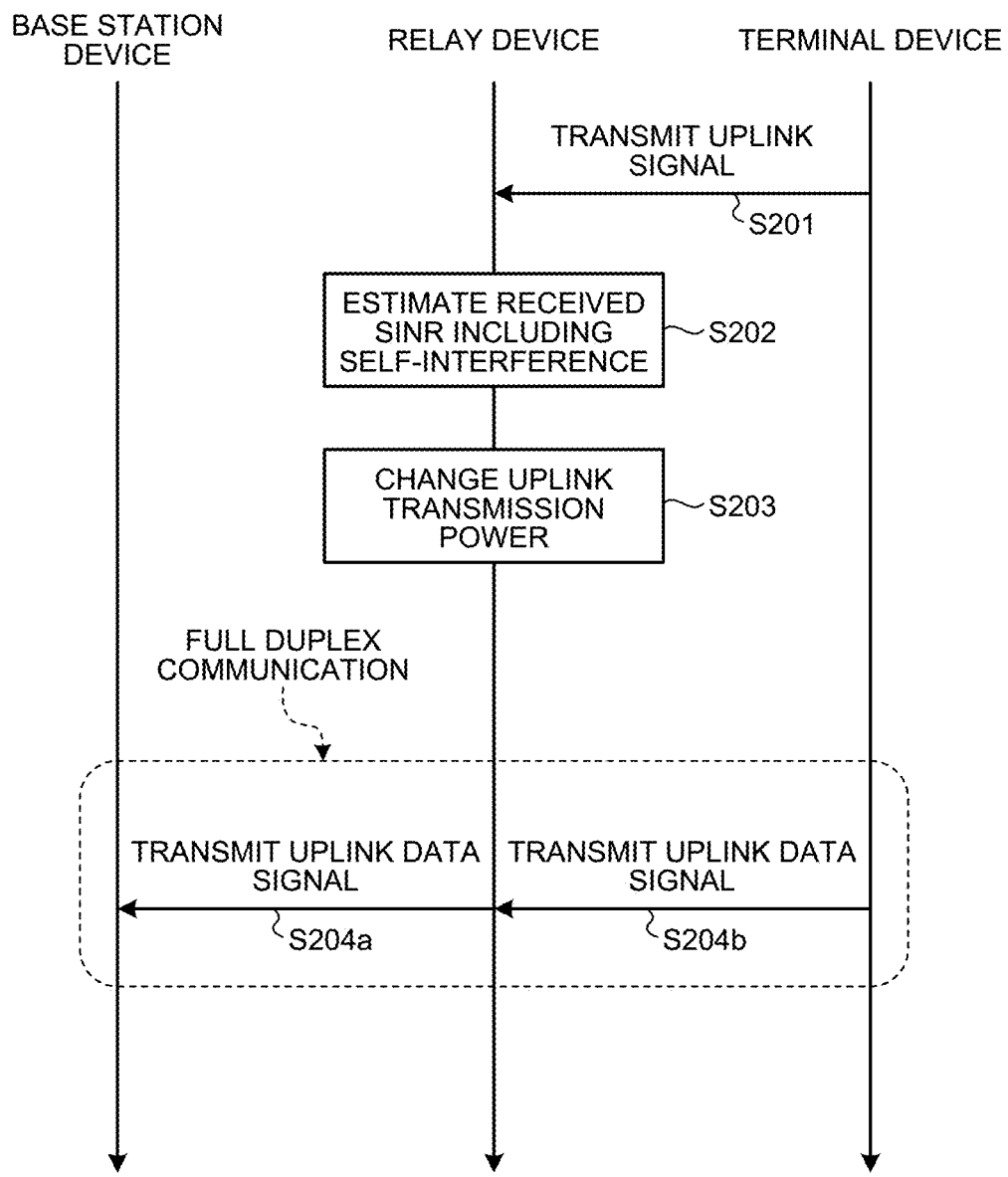

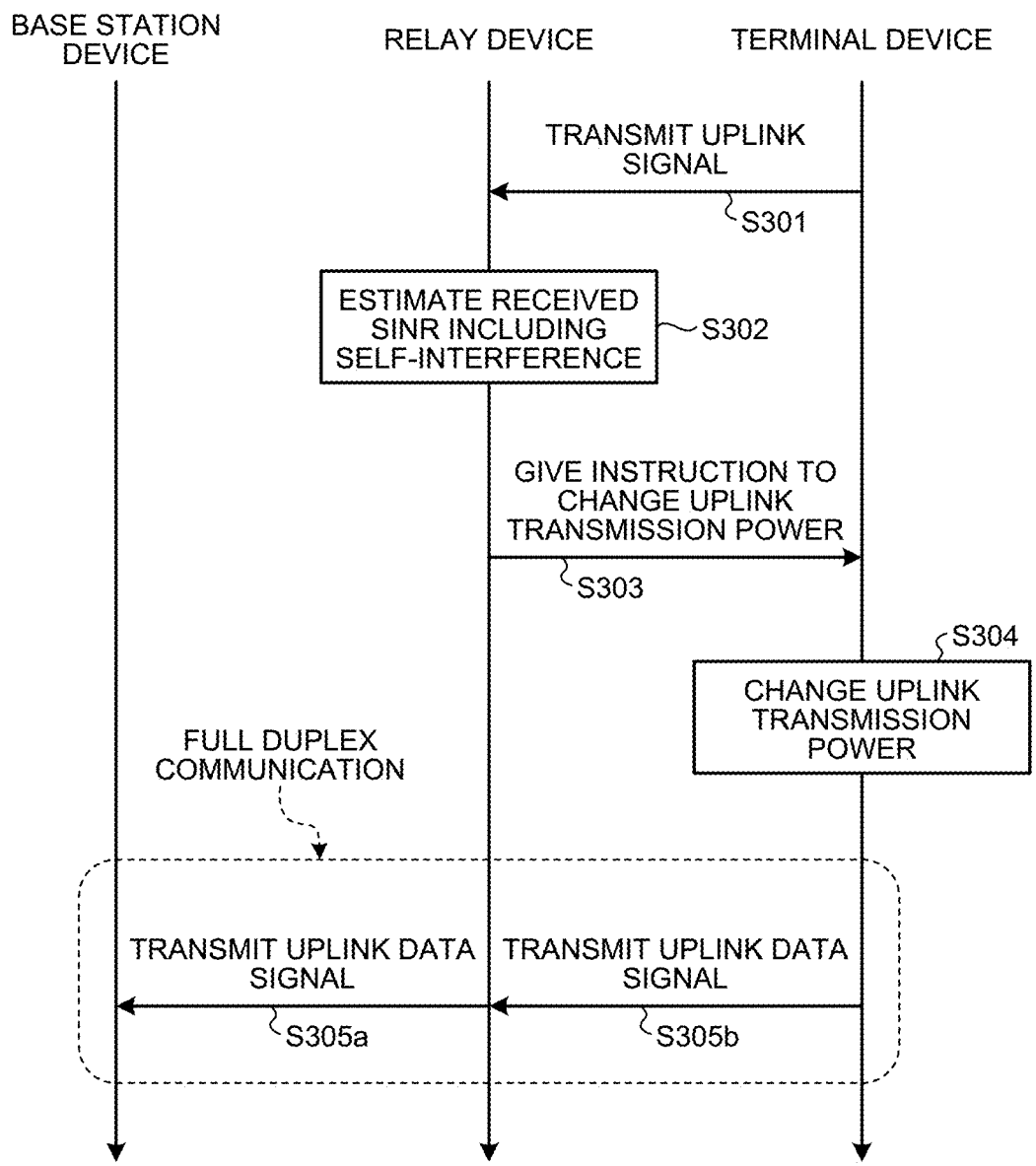

COMMUNICATION DEVICE, INFORMATION PROCESSING DEVICE, COMMUNICATION METHOD, AND INFORMATION PROCESSING METHOD

CROSS-REFERENCE TO RELATED APPLICATIONS

The present application is based on PCT filing PCT/JP2020/018348, filed Apr. 30, 2020, which claims priority to JP 2019-096417, filed May 22, 2019, the entire contents of each are incorporated herein by reference.

FIELD

The present disclosure relates to a communication device, an information processing device, a communication method, and an information processing method.

BACKGROUND

With the progress of communication technology, communication performance is greatly improved as found in improvement in frequency utilization efficiency, reduction in delay, and the like. In recent years, however, communication technology has been studied to further improve the communication performance. For example, in recent years, in-band full duplex has been considered in order to further improve the frequency utilization efficiency.

CITATION LIST

Patent Literature

Patent Literature 1: WO 2005/045555

SUMMARY

Technical Problem

High communication performance is, however, not necessarily achieved only by introducing new communication technology. For example, in in-band full duplex, one communication device simultaneously performs transmission and reception by using the same band. A signal transmitted by the communication device leaks into a reception circuit of the communication device itself, which causes extraordinarily strong self-interference. In such a case, the communication device has to use a conventional communication method after all in order to avoid interference between a transmission signal and a reception signal, and as a result, high communication performance may fail to be achieved.

Therefore, the present disclosure proposes a communication device, an information processing device, a communication method, and an information processing method capable of achieving high communication performance.

Solution to Problem

To solve the above problem, a communication device according to the present disclosure includes: a communication unit that is allowed to simultaneously perform data transmission and data reception by using a same band; an acquisition unit that acquires information regarding self-interference generated at a time when the data transmission and the data reception are simultaneously performed by using the same band; and a communication control unit that performs control regarding the data transmission based on information regarding the self-interference or information from another device generated based on the information regarding the self-interference.

BRIEF DESCRIPTION OF DRAWINGS

FIG. 17 illustrates one example of the transmission power control sequence of an uplink backhaul link.
FIG. 18 illustrates one example of a transmission power control sequence of an uplink access link.

DESCRIPTION OF EMBODIMENTS

Figure 1:
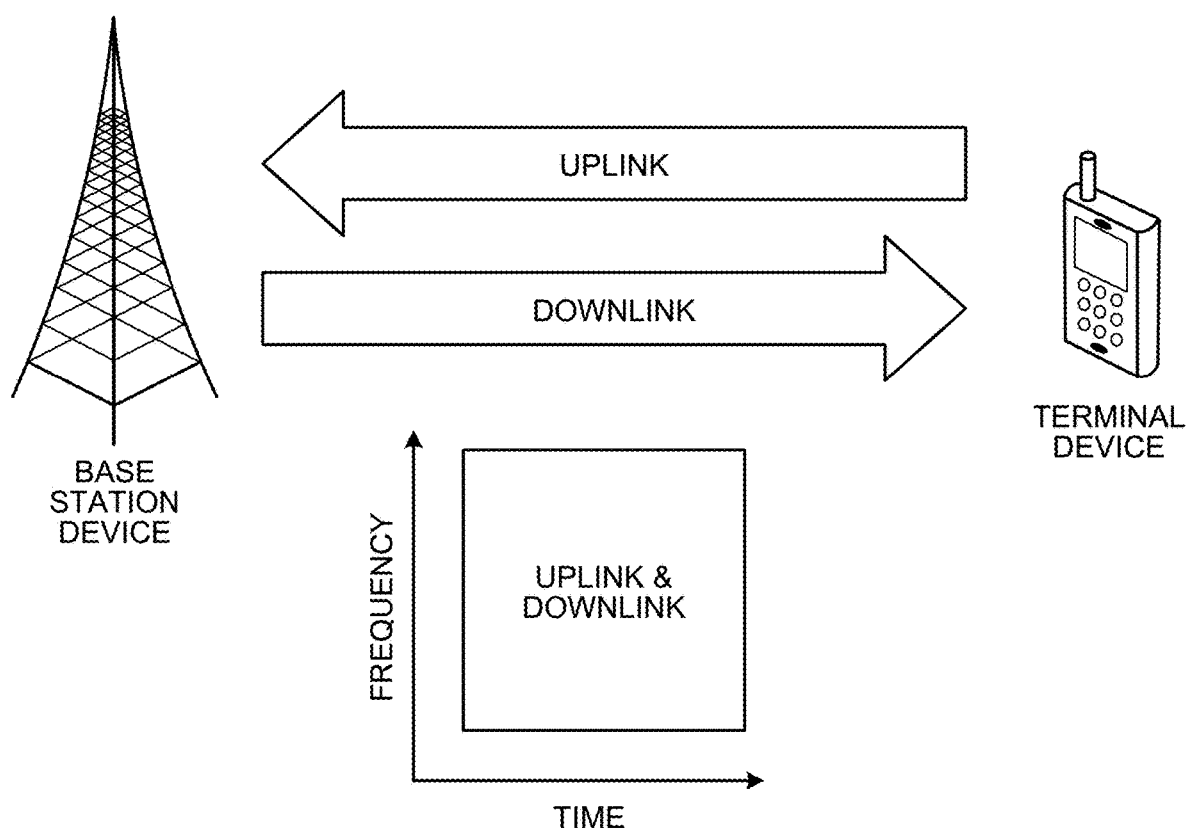
FIG. 1 outlines in-band full duplex.

An embodiment of the present disclosure will be described in detail below with reference to the drawings. Note that, in the following embodiment, the same signs are attached to the same parts to omit duplicate description.

Furthermore, in the present specification and the drawings, a plurality of components having substantially the same functional configuration may be distinguished by attaching different numbers after the same signs. For example, a plurality of configurations having substantially the same functional configuration is distinguished as terminal devices $40_1$, $40_2$, and $40_3$, as necessary. Note, however, that, when it is not necessary to particularly distinguish a plurality of components having substantially the same functional configuration, only the same signs are attached. For example, when it is not necessary to particularly distinguish the terminal devices $40_1$, $40_2$, and $40_3$, the terminal devices $40_1$, $40_2$, and $40_3$ are simply referred to as the terminal device 40.

Furthermore, the present disclosure will be described in accordance with the following item order.

1. Introduction
    1-1. Outline of In-Band Full Duplex
    1-2. Residual Self-Interference
2. Configuration of Communication System
    2-1. Overall Configuration of Communication System
    2-2. Configuration of Management Device
    2-3. Configuration of Base Station Device
    2-4. Configuration of Relay Device
    2-5. Configuration of Terminal Device
    2-6. Configuration of Assumed System
3. Self-interference from Uplink Backhaul Link Transmission to Uplink Access Link Reception
    3-1. Resources Usable for Full Duplex in Full Duplex Relay System
    3-2. Object Controlled Based on Information Regarding Self-Interference
    3-3. Method of Calculating Self-Interference Amount
    3-4. Transmission Power Control Object (1): Uplink Backhaul Link
    3-5. Transmission Power Control Object (2): Uplink Access Link
4. Transmission Power Control Object (1) Method 1: Control Performed by Parent Node
    4-1. Report of Information Regarding Self-Interference to Parent Node
        4-1-1. Reporting Method 1: Report Performed by Power Head Room
        4-1-2. Reporting Method 2: Report Performed by Overload Indicator
        4-1-3. Reporting Method 3: Report as One Piece of Information of CSI Feedback
        4-1-4. Reporting Method 4: Reporting Uplink Transmission Power +Interference Cancellation Capability
        4-1-5. Reporting Method 5: Reporting Calculated Self-Interference Amount
        4-1-6. Information Regarding Self-Interference to Be Reported
    4-2. Scheduling of Uplink Backhaul Link Performed by Parent Node
        4-2-1. Signaling 1: UL Grant
        4-2-2. Signaling 2: TPC Command
        4-2-3. Signaling 3: Slot Format Indicator
        4-2-4. Signaling 4: RRC Signaling
        4-2-5. Other Signaling
    4-3. One Example of Transmission Power Control Sequence of Uplink Backhaul Link
5. Transmission Power Control Object (1) Method 2: Control Based on Determination of Child Node Itself
    5-1. Open-Loop Transmission Power Control
    5-2. Transmission Power Control Under Condition
    5-3. One Example of Transmission Power Control Sequence of Uplink Backhaul Link
6. Transmission Power Control Object (2): Uplink Access Link
    6-1. Scheduling
    6-2. One Example of Transmission Power Control Sequence of Uplink Access Link
7. Self-Interference from Downlink Access Link Transmission to Downlink Backhaul Link Reception
8. Variations
9. Conclusion

1. Introduction

With rapid increase in mobile traffic in recent years, innovative technology for improving frequency utilization efficiency has been actively studied. In-band full duplex is considered as one of such typical pieces of technology.

1-1. Outline of In-Band Full Duplex

FIG. 1 outlines in-band full duplex. In conventional full duplex, communication is performed by using frequencies different in a transmission band and a reception band in order to avoid interference between a transmission signal and a reception signal. In contrast, transmission and reception are simultaneously performed by using the same band in the in-band full duplex. Note that, in the in-band full duplex, a signal transmitted by a communication device leaks into a reception circuit of the communication device itself, which causes extraordinarily strong self-interference. Progress of interference cancellation technology, however, can reduce the self-interference. It is assumed that the progress of the interference cancellation technology can make frequency utilization efficiency up to twice higher than that in the conventional full duplex.

Figure 2:
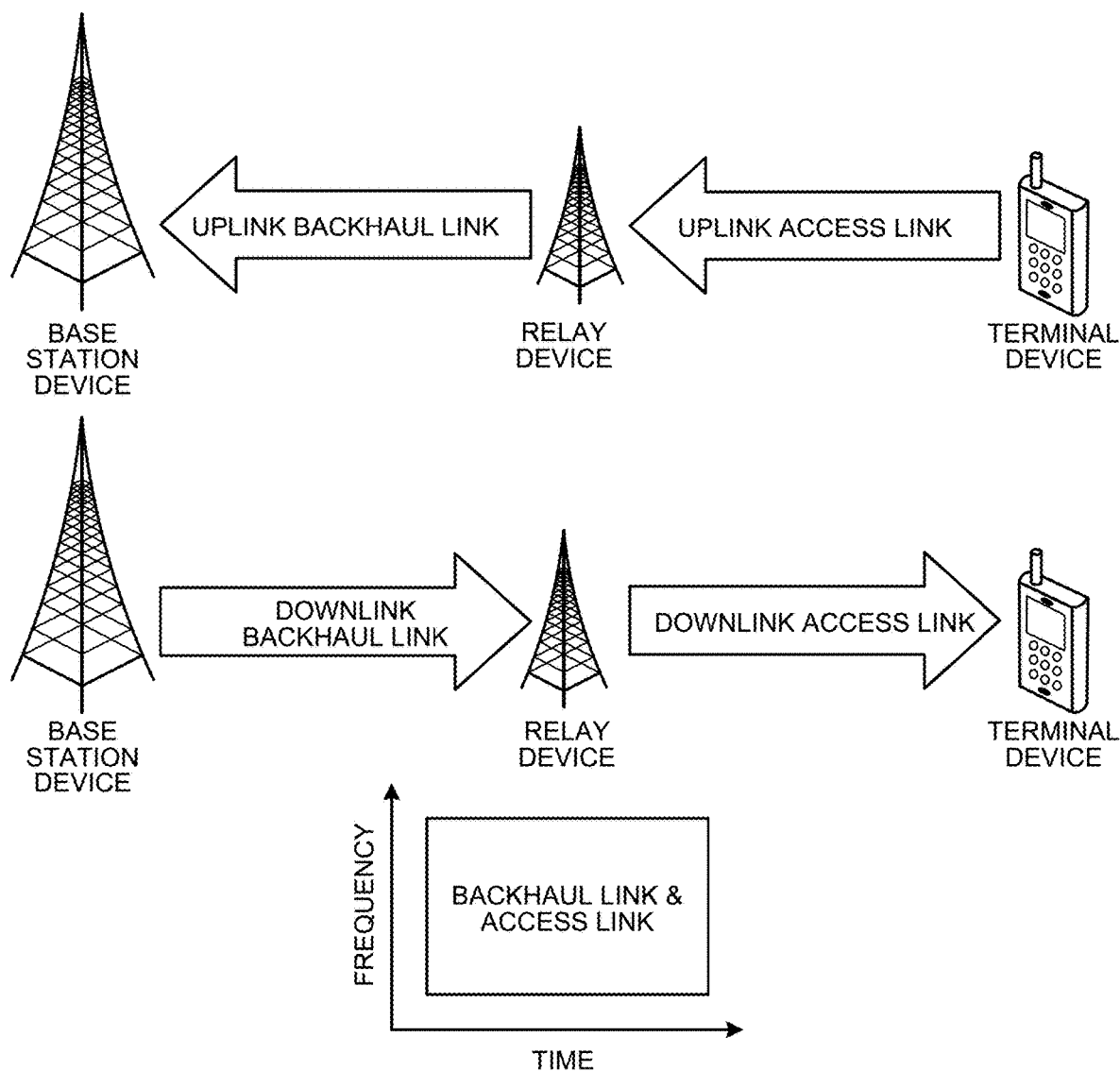
FIG. 2 illustrates one example of a backhaul link and an access link of the in-band full duplex.

FIG. 2 illustrates one example of a backhaul link and an access link of in-band full duplex. In the embodiment, in-band full duplex between the backhaul link and the access link is assumed. In the in-band full duplex, a self-interference canceller is assumed to be mounted in a relay device (relay station). The relay device performs the in-band full duplex between the backhaul link and the access link, which can reduce packet transmission delay caused by passage through the relay device in addition to improving frequency utilization efficiency. Note that, although the in-band full duplex between a backhaul link and an access link is described as one example in the embodiment, the present invention can be applied to in-band full duplex between a backhaul link and a backhaul link, and equivalent effects can be expected.

Here, the relay device of the embodiment transmits information from one communication device to another communication device. Specifically, the relay device receives a signal from one communication device, and transmits a signal to the other communication device. In the embodiment, the relay device is assumed to perform radio communication between one communication device and the relay device and between the relay device and the other communication device.

1-2. Residual Self-Interference

Figure 3:
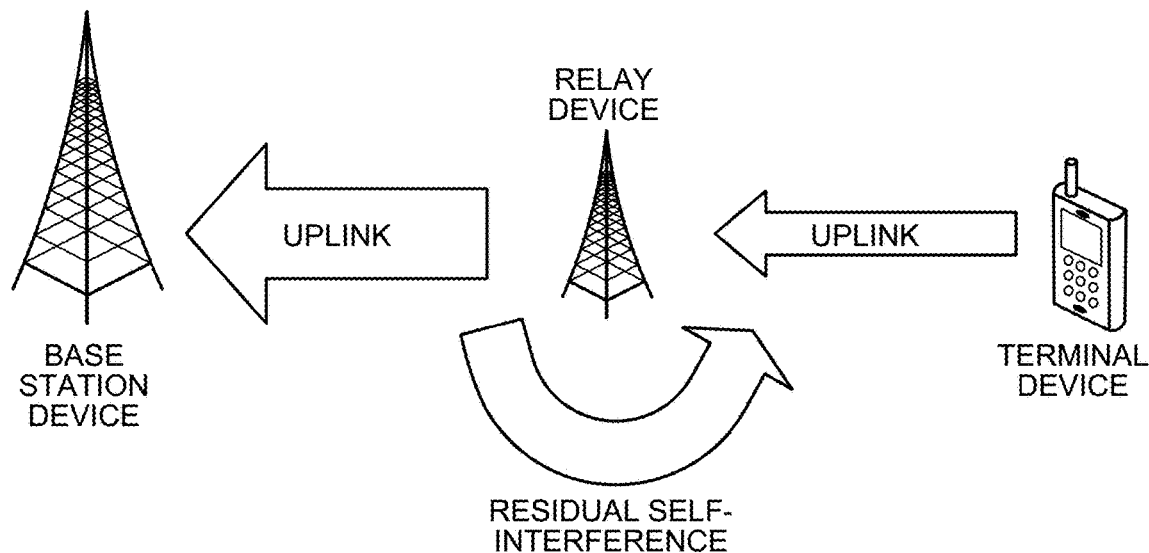
FIG. 3 illustrates residual self-interference generated in the in-band full duplex.
Figure 4:
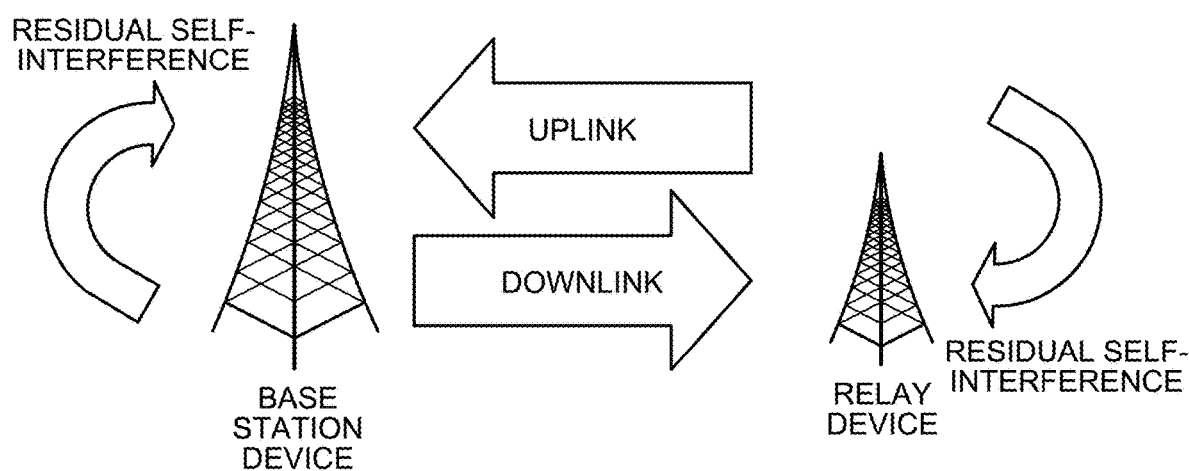
FIG. 4 illustrates the residual self-interference generated in the in-band full duplex.

FIGS. 3 and 4 illustrate residual self-interference generated in the in-band full duplex. As described above, in the embodiment, a self-interference canceller is assumed to be mounted in a communication device such as a relay device. It is, however, extremely difficult to remove all self-interference even by using the interference cancellation technology. Self-interference that cannot be removed (residual self-interference) deteriorates reception characteristics of a communication device that performs in-band full duplex. In particular, as transmission power is increased, wraparound residual self-interference power is also increased in proportion, reception using the same resources as transmission becomes difficult.

Therefore, the communication device (e.g., relay device that performs in-band full duplex) of the embodiment controls the transmission power of a signal transmitted by using radio resources (hereinafter, also referred to as full duplex resources) for the in-band full duplex while considering the influence of the reception power and the residual self-interference power.

For example, to put it by using the example of FIG. 3, the communication device (e.g., relay device or base station device) recognizes resources for the in-band full duplex between a backhaul link and an access link. The backhaul link is a link between a base station device (including relay device) and a base station device (including relay device). The access link is a link between a base station device (including relay device) and a terminal device. Then, the communication device preliminarily estimates assumed reception power of an uplink access link transmitted from a terminal device and residual self-interference generated by data transmission using an uplink backhaul link (link in uplink direction in backhaul link), and predicts estimated reception quality (channel quality indicator (CQI)). The communication device controls another communication device (e.g., terminal device) on the data transmission side to increase transmission power in data transmission using the uplink access link based on the estimated reception quality. Alternatively, a control source communication device (e.g., relay device or base station device) controls the control source communication device itself (e.g., relay device) or another communication device (relay device if the control source communication device is base station device) to decrease the transmission power in data transmission using the uplink backhaul link.

Figure 5:
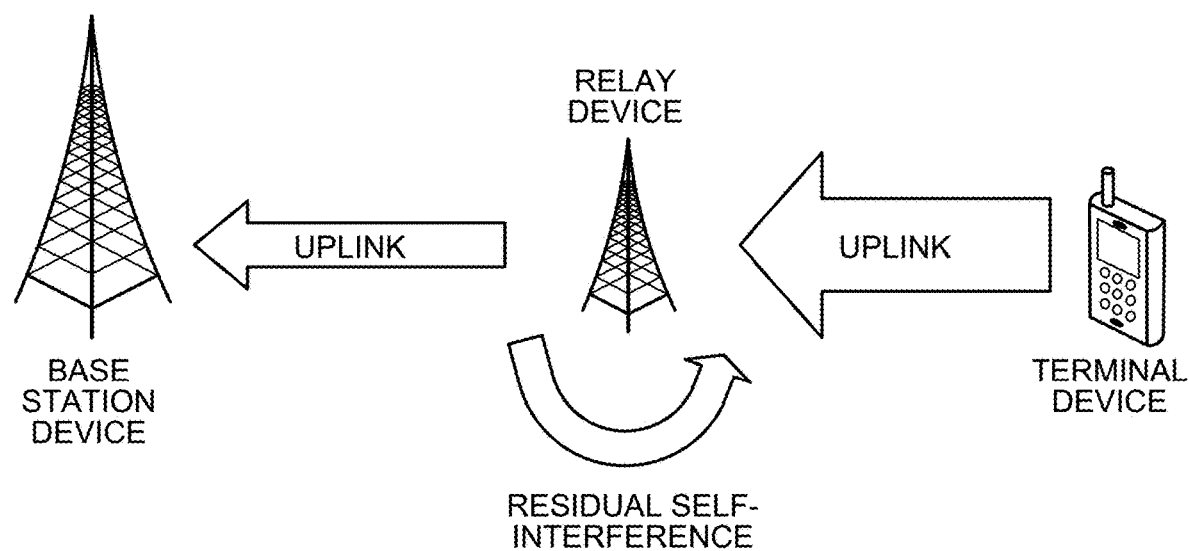
FIG. 5 illustrates communication control in consideration of the residual self-interference.

FIG. 5 illustrates communication control in consideration of the residual self-interference. The communication control of the embodiment allows the communication device to achieve high-quality in-band full duplex. As a result, the communication device can achieve high communication performance.

Although the embodiment has been outlined above, a communication system 1 of the embodiment will be described in detail below. Note that, in the following description, "in-band full duplex" may be simply referred to as "full-duplex".

2. Configuration of Communication System

The communication system 1 includes a base station device, and can be wirelessly connected to a terminal device.

Note that the communication system 1 may support radio access technology (RAT) such as long term evolution (LTE) and new radio (NR). The LTE and the NR are types of cellular communication technology, and enable mobile communication of a terminal device by arranging a plurality of areas covered by a base station in a cell shape.

Note that, in the following description, the "LTE" includes LTE-Advanced (LTE-A), LTE-Advanced Pro (LTE-A Pro), and evolved universal terrestrial radio access (EUTRA). Furthermore, the NR includes new radio access technology (NRAT) and further EUTRA (FEUTRA). Note that a single base station may manage a plurality of cells. In the following description, a cell corresponding to the LTE is referred to as an LTE cell, and a cell corresponding to the NR is referred to as an NR cell.

The NR is radio access technology (RAT) of a next generation (fifth generation) of the LTE (fourth generation communication including LTE-Advanced and LTE-Advanced Pro). The NR is radio access technology that can support various use cases including enhanced mobile broadband (eMBB), massive machine type communications (mMTCs), and ultra-reliable and low latency communications (URLLCs). The NR has been studied aiming at a technical framework corresponding to utilization scenarios, requirement conditions, arrangement scenarios, and the like in these use cases.

Hereinafter, the configuration of the communication system 1 will be specifically described.

2-1. Overall Configuration of Communication System

Figure 6:
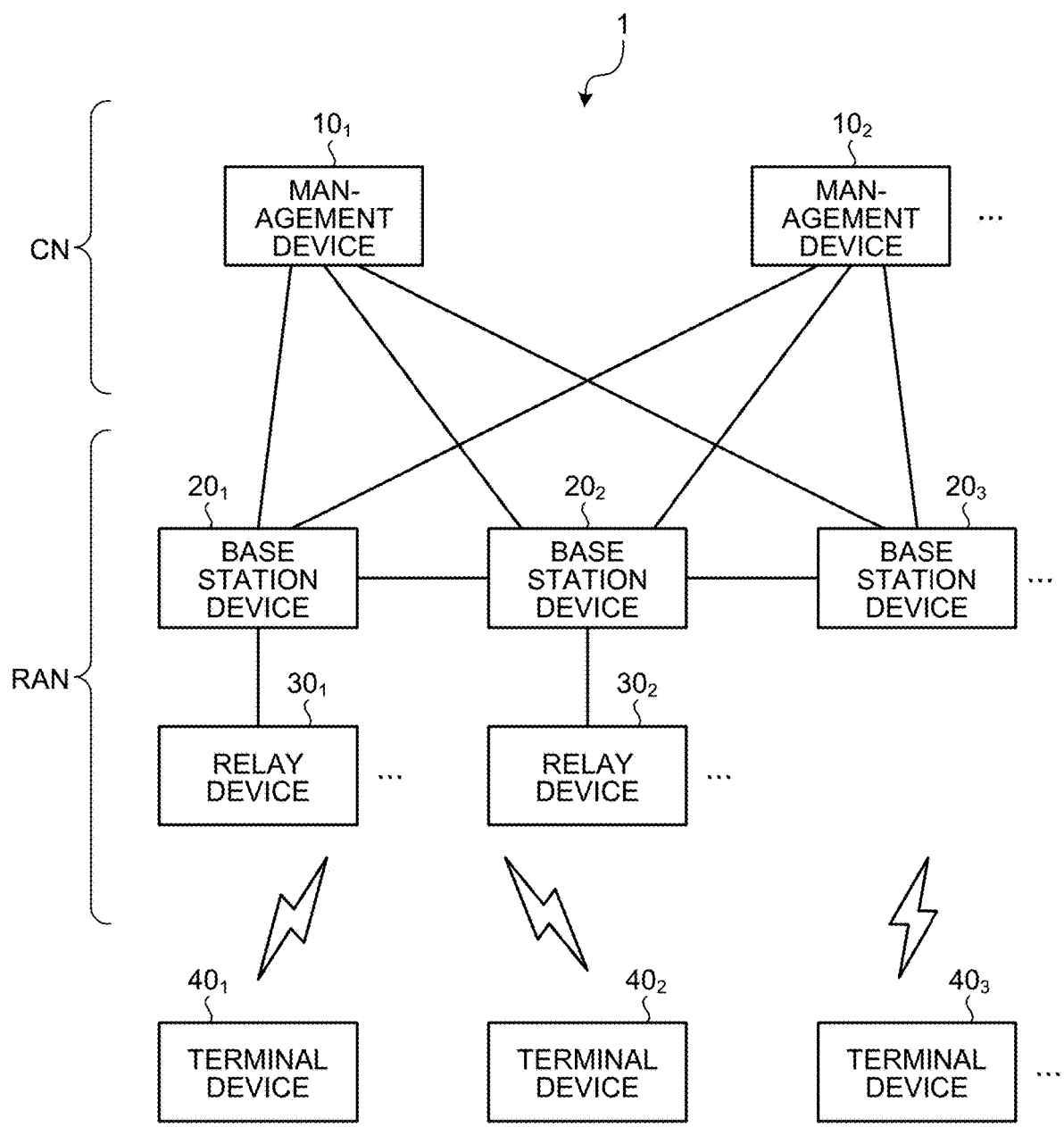
FIG. 6 illustrates a configuration example of a communication system according to an embodiment of the present disclosure.

FIG. 6 illustrates a configuration example of the communication system 1 according to the embodiment of the present disclosure. The communication system 1 is a radio communication system that provides a radio access network to a terminal device. For example, the communication system 1 is a cellular communication system using radio access technology such as the LTE and the NR. Here, the radio access network may be an evolved universal terrestrial radio access network (E-UTRAN) or a next generation radio access network (NG-RAN).

As illustrated in FIG. 6, the communication system 1 includes a management device 10, a base station device 20, a relay device 30, and the terminal device 40. The communication system 1 provides a radio network that enables mobile communication to a user by radio communication devices constituting the communication system 1 operating in cooperation. The radio network of the embodiment includes a radio access network RAN and a core network CN. Note that the radio communication device has a function of wireless communication. In the example of FIG. 6, the base station device 20, the relay device 30, and the terminal device 40 correspond to the radio communication device.

The communication system 1 may include a plurality of management devices 10, a plurality of base station devices 20, a plurality of relay devices 30, and a plurality of terminal devices 40. In the example of FIG. 6, the communication system 1 includes management devices $10_1$ and $10_2$ as the management device 10. Furthermore, the communication system 1 includes base station devices $20_1$, $20_2$, and $20_3$, and the like as the base station device 20, and includes relay devices $30_1$, and $30_2$, and the like as the relay device 30. Furthermore, the communication system 1 includes terminal devices $40_1$, $40_2$, and $40_3$, and the like as the terminal device 40.

Note that the devices in the figure may be considered as devices in a logical sense. That is, parts of devices in the figure may be achieved by a virtual machine (VM), a container, a docker, and the like, and implemented on physically the same hardware.

Note that a base station of the LTE may be referred to as an evolved node B (eNodeB) or an eNB. Furthermore, a base station of the NR may be referred to as a next generation RAN node (NGRAN node), a gNodeB, or a gNB. Furthermore, in the LTE and the NR, a terminal device (also referred to as mobile station, mobile station device, or terminal) may be referred to as user equipment (UE). Note that the terminal device is a type of communication device, and is also referred to as a mobile station, a mobile station device, or a terminal.

In the embodiment, the concept of the communication device includes not only a portable moving object device (terminal device) such as a mobile terminal but a device installed in a structure or a moving object. The structure or the moving object itself may be regarded as the communication device. Furthermore, the concept of the communication device includes not only a terminal device but a base station device and a relay device. The communication device is a type of processing device and information processing device. Furthermore, the communication device can be rephrased as a transmission device or a reception device.

Management Device

The management device 10 manages a radio network. For example, the management device 10 manages communication of the base station device 20. For example, the management device 10 functions as a mobility management entity (MME), an access and mobility management function (AMF), or a session management function (SMF).

The management device 10 constitutes the core network CN together with a gateway device and the like. The core network CN is, for example, a network of a predetermined entity such as a mobile network operator. For example, the core network CN is an evolved packet core (EPC) or a 5G core network (5GC). Note that the predetermined entity may be the same as or different from an entity that uses, operates, and/or manages the base station device 20.

Note that the management device 10 may have a function of a gateway. For example, when the core network is an EPC, the management device 10 may have a function as an S-GW or a P-GW. Furthermore, when the core network is the 5GC, the management device 10 may have a function as a user plane function (UPF). Furthermore, the management device 10 may be an SMF, a PCF, a UDM, or the like. The core network CN may include the SMF, the PCF, the UDM, or the like.

Note that the management device 10 is not necessarily required to constitute the core network CN. For example, the core network CN is a core network of wideband code division multiple access (W-CDMA) or code division multiple access 2000 (cdma 2000). In the case, the management device 10 may function as a radio network controller (RNC).

The management device 10 is connected to each of a plurality of base station devices 20. For example, in the case of 5GS, an N2 reference point is provided between an AMF and a NG-RAN, and the AMF and the NG-RAN are logically connected to each other via an NG interface.

The base station device 20 manages communication. For example, the management device 10 manages the position of the terminal device 40 for each terminal device 40 in units of areas (e.g., tracking area and RAN notification area) including a plurality of cells. Note that the management device 10 may grasp and manage, for each terminal device 40, which base station device (or which cell) the terminal device 40 is connected to, which base station device (or which cell) the terminal device 40 is provided in a communication area of, and the like.

A cell provided by the base station device 20 is referred to as a serving cell. The serving cell may include a primary cell (pCell) and a secondary cell (sCell). When dual connectivity is provided to UE (e.g., terminal device 40), a pCell and an sCell(s) provided by a master node (MN) are referred to as a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Moreover, the serving cell may include a primary secondary cell or a primary SCG cell (PSCell). That is, when the dual connectivity is provided to the UE, a PSCell and an sCell(s) provided by a secondary node (SN) are referred to as a secondary cell group (SCG).

One downlink component carrier and one uplink component carrier may be associated with one cell. Furthermore, a system bandwidth corresponding to one cell may be divided into a plurality of bandwidth parts (BWPs). In this case, one or a plurality of BWPs may be set to UE, and the UE may use one BWP as an active BWP. Furthermore, radio resources (e.g., frequency band, numerology (subcarrier spacing), and slot format (slot configuration)) that can be used by the terminal device 40 may be different for each cell, each component carrier, or each BWP. Furthermore, one base station device may provide a plurality of cells.

Base Station Device

The base station device 20 is a radio communication device that wirelessly communicates with the terminal device 40. The base station device 20 is a type of communication device. Furthermore, the base station device 20 is a type of information processing device.

The base station device 20 may correspond to, for example, a radio base station (e.g., base station, Node B, eNB, and gNB) or a radio access point. Note that, when the base station device 20 is an eNB, a gNB, or the like, the base station device 20 may be referred to as a 3GPP access. Furthermore, when the base station device 20 is a radio access point, the base station device 20 may be referred to as a non-3GPP access. Furthermore, the base station device 20 may be a radio relay station (relay node). Furthermore, the base station device 20 may be an optical extension device called a remote radio head (RRH). Furthermore, the base station device 20 may be a reception station device such as a field pickup unit (FPU). Furthermore, the base station device 20 may be an integrated access and backhaul (IAB) donor node or an IAB relay node, which provide a radio access line and a radio backhaul line by time division multiplexing, frequency division multiplexing, or space division multiplexing.

Note that, when the base station device 20 is a gNB, the base station device may be referred to as a combination of a gNB central unit (gNB CU) and a gNB distributed unit (gNB DU) or either thereof. In the embodiment, a base station of a radio communication system may be referred to as a base station device. The base station device 20 may be capable of wirelessly communicating with another base station device 20. For example, when a plurality of base station devices 20 is eNBs or a combination of an eNB and a gNB, the devices may be connected by an X2 interface. Furthermore, when the plurality of base station devices 20 is gNBs or a combination of an eNB and a gNB, the devices may be connected by an Xn interface. Furthermore, when the plurality of base station devices 20 is a combination of a gNB CU and a gNB DU, the devices may be connected by an F1 interface. The later-described message/information (information on RRC signaling or DCI) may be communicated between the plurality of base station devices 20 (e.g., via X2, Xn, or F1 interface).

Note that the radio access technology used by the base station device 20 may be cellular communication technology or radio LAN technology. Of course, the radio access technology used by the base station device 20 is not limited thereto, and other wireless access technology may be used. The radio access technology used by the base station device 20 may be a low power wide area (LPWA) communication technology. Here, LPWA communication is compliant with an LPWA standard. Examples of the LPWA standard include, for example, ELTRES, ZETA, SIGFOX, LoRaWAN, NB-Iot, and the like. Of course, the LPWA standard is not limited thereto, and other LPWA standards may be used. In addition, the radio communication used by the base station device 20 may be performed by using millimeter waves. Furthermore, the radio communication used by the base station device 20 may be performed by using radio waves, or by infrared rays or visible light (optical radio transmission).

The base station device 20 may be capable of non-orthogonal multiple access (NOMA) communication with the terminal device 40. Here, the NOMA communication is communication (transmission, reception, or both thereof) using non-orthogonal resources. Note that the base station device 20 may be capable of the NOMA communication with another base station device 20 and the relay device 30.

Note that the base station devices 20 may be capable of communicate with each other via a base station device-core network interface (e.g., S1 interface). The interface may be either a wired interface or a wireless interface. Furthermore, the base station devices may be capable of communicating with each other via an inter-base station device interface (e.g., X2 interface and S1 interface). The interface may be either a wired interface or a wireless interface.

Note that a plurality of base station devices 20 may be capable of communicating with each other via a base station device-core network interface (e.g., NG interface and S1 interface). The interface may be either a wired interface or a wireless interface. Furthermore, the base station devices may be capable of communicating with each other via an inter-base station device interface (e.g., Xn interface and X2 interface). The interface may be either a wired interface or a wireless interface.

The base station device 20 may be used, operated, and/or managed by various entities. For example, the entity may be assumed to be a mobile network operator (MNO), a mobile virtual network operator (MVNO), a mobile virtual network enabler (MVNE), a neutral host network (NHN) operator, an enterprise, an educational institution (e.g., educational corporation and school board of each local government), a real estate (e.g., building and apartment) administrator, an individual, and the like.

Of course, an entity that uses, operates, and/or manages the base station device 20 is not limited thereto. The base station device 20 may be installed and/or operated by one operator, or may be installed and/or operated by one individual. Of course, an entity of the installation/operation of the base station device 20 is not limited thereto. For example, the base station device 20 may be installed/operated by a plurality of operators or a plurality of individuals in cooperation. Furthermore, the base station device 20 may be shared facilities used by a plurality of operators or a plurality of individuals. In this case, a third party different from a user may install/operate the facilities.

Note that the concept of the base station device (also referred to as base station) includes not only a donor base station but a relay base station (also referred to as relay station or relay station device). Furthermore, the concept of the base station includes not only a structure having a function of a base station but a device installed in the structure.

The structure is, for example, a building such as a tall building, a house, a steel tower, station facilities, airport facilities, harbor facilities, and a stadium. Note that the concept of the structure includes not only a building but a non-building structure such as a tunnel, a bridge, a dam, a wall, and an iron pillar, and facilities such as a crane, a gate, and a windmill. Furthermore, the concept of the structure includes not only a structure on land (on ground in narrow sense) or in the ground but a structure on water such as a pier and a megafloat, and a structure under water such as marine observation facilities. The base station device can be rephrased as a processing device or an information processing device.

The base station device 20 may be a donor station or a relay station. Furthermore, the base station device 20 may be a fixed station or a mobile station. The mobile station is a movable radio communication device (e.g., base station device). In this case, the base station device 20 may be installed in a moving object, or may be a moving object itself. For example, a relay station device having mobility can be regarded as the base station device 20 serving as a mobile station. Furthermore, a device originally having the mobility and mounted with a function (at least part of function of base station device) of a base station device, such as a vehicle, a drone (aerial vehicle), and a smartphone, also corresponds to the base station device 20 serving as the mobile station.

Here, the moving object may be a mobile terminal such as a smartphone and a mobile phone. Furthermore, the moving object may be a moving object that moves on land (on ground in narrow sense) (e.g., vehicle such as automobile, bicycle, bus, truck, motorcycle, train, and linear motor car) or a moving object that moves in the ground (e.g., in tunnel) (e.g., subway).

Furthermore, the moving object may be a moving object that moves on water (e.g., vessel such as passenger ship, cargo ship, and hovercraft) or a moving object that moves under water (e.g., submersible ship such as submersible, submarine, and unmanned submersible machine).

Furthermore, the moving object may be a moving object that moves in the atmosphere (e.g., aircraft (aerial vehicle) such as airplane, airship, and drone) or a moving object that moves outside the atmosphere (e.g., artificial celestial body such as artificial satellite, spacecraft, space station, and probe). The moving object that moves outside the atmosphere can be rephrased as a space moving object.

Furthermore, the base station device 20 may be a ground base station device (ground station device) installed on the ground. For example, the base station device 20 may be disposed in a structure on the ground, or may be installed in a moving object that moves on the ground. More specifically, the base station device 20 may be an antenna installed in a structure such as a building and a signal processing device connected to the antenna. Of course, the base station device 20 may be a structure or a moving object itself. "On the ground" has a broad sense including not only on the land (on ground in narrow sense) but in the ground, on water, and under water. Note that the base station device 20 is not limited to the ground base station device. The base station device 20 may be a non-ground base station device (non-ground station device) capable of floating in the air or space. For example, the base station device 20 may be an aircraft station device or a satellite station device.

An aircraft station device is a radio communication device capable of floating in the atmosphere (including stratosphere), such as an aircraft. The aircraft station device may be mounted in an aircraft and the like, or may be an aircraft itself. Note that the concept of the aircraft includes not only a heavy aircraft such as an airplane and a glider but a light aircraft such as a balloon and an airship. Furthermore, the concept of the aircraft includes not only the heavy aircraft and the light aircraft but a rotorcraft such as a helicopter and an autogyro. Note that the aircraft station device (or aircraft mounted with aircraft station device) may be an unmanned aircraft such as a drone.

Note that the concept of the unmanned aircraft also includes an unmanned aircraft system (UAS) and a tethered unmanned aircraft system (tethered UAS). Furthermore, the concept of unmanned aircraft includes a lighter than air (LTA) UAS and heavier than air (HTA) UAS. In addition, the concept of the unmanned aircraft also includes a high altitude UAS platform (HAP).

The satellite station device is a radio communication device capable of floating outside the atmosphere. The satellite station device may be mounted in a space moving object such as an artificial satellite, or may be a space moving object itself. A satellite serving as the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be mounted in a low earth orbiting satellite, a middle earth orbiting satellite, a geostationary earth orbiting satellite, or a highly elliptical orbiting satellite.

The coverage of the base station device 20 may be as large as a macro cell, or as small as a pico cell. Of course, the coverage of the base station device 20 may be as extremely small as a femto cell. Furthermore, the base station device 20 may have a beamforming capability. In this case, in relation to the base station device 20, a cell or a service area may be formed for each beam.

In the example of FIG. 6, the base station device $20_1$ is connected to the relay device $30_1$, and the base station device $20_2$ is connected to the relay device $30_2$. The base station device $20_1$ can indirectly and wirelessly communicate with the terminal device 40 via the relay device $30_1$. Similarly, the base station device $20_2$ can indirectly and wirelessly communicate with the terminal device 40 via the relay device $30_2$.

Relay Device

The relay device 30 serves as a relay station of a base station. The relay device 30 is a type of base station device. Furthermore, the relay device 30 is a type of information processing device. The relay device can be rephrased as a relay base station device (or relay base station).

The relay device 30 can perform wireless communication such as the NOMA communication with the terminal device 40. The relay device 30 relays communication between the base station device 20 and the terminal device 40. Note that the relay device 30 may be capable of wirelessly communicating with another relay device 30 and the base station device 20. The relay device 30 may be a ground station device or a non-ground station device. The relay device 30 constitutes a radio access network RAN together with the base station device 20.

Note that the relay device of the embodiment may be a fixed device, a movable device, or a floatable device. Furthermore, the size of the coverage of the relay device of the embodiment is not limited to a specific size. For example, the cell covered by the relay device may be a macro cell, a micro cell, or a small cell.

Furthermore, the relay device of the embodiment is not limited to a mounted device as long as the relay function is satisfied. For example, the relay machine may be mounted in a terminal device such as a smartphone, may be mounted in an automobile or a human-powered vehicle, may be mounted in a balloon, an airplane, or a drone, or may be mounted in a home appliance such as a television, a game machine, an air conditioner, a refrigerator, and a lighting fixture.

In addition, the relay device 30 may have a configuration similar to the configuration of the above-described base station device 20. For example, similarly to the above-described base station device 20, the relay device 30 may be installed in a moving object, or may be a moving object itself. As described above, the moving object may be a mobile terminal such as a smartphone and a mobile phone. Furthermore, the moving object may move on land (on ground in narrow sense), or may move in the ground. Of course, the moving object may move on water, or may move under water. In addition, the moving object may move in the atmosphere, or may move outside the atmosphere. Furthermore, the base station device 20 may be a ground station device or a non-ground station device. In this case, the relay device 30 may be an aircraft station device or a satellite station device.

Furthermore, similarly to the base station device 20, the coverage of the relay device 30 may be as large as a macro cell, or as small as a pico cell. Of course, the coverage of the relay device 30 may be as extremely small as a femto cell. Furthermore, the relay device 30 may have beamforming capability. In this case, in relation to the relay device 30, a cell or a service area may be formed for each beam.

In addition, the relay device 30 may have a configuration similar to the configuration of the above-described base station device 20.

Terminal Device

The terminal device 40 is a radio communication device that wirelessly communicates with the base station device 20 or the relay device 30. The terminal device 40 is, for example, a mobile phone, a smart device (smartphone or tablet), a personal digital assistant (PDA), and a personal computer. Furthermore, the terminal device 40 may be a device such as a business camera provided with a communication function, or may be a motorcycle, a moving relay vehicle, or the like mounted with communication equipment such as a field pickup unit (FPU). Furthermore, the terminal device 40 may be a machine to machine (M2M) device or an Internet of Things (IoT) device. The terminal device 40 may be referred to as, for example, MTC UE, NB-IoT UE, or Cat.M UE.

Furthermore, the terminal device 40 may be capable of performing sidelink communication with another terminal device 40. The terminal device 40 may be capable of using automatic retransmission technology such as HARQ when performing the sidelink communication. The terminal device 40 may be capable of performing NOMA communication with the base station device 20 and the relay device 30. Note that the terminal device 40 may also be capable of performing the NOMA communication in communication (sidelink) with another terminal device 40. Furthermore, the terminal device 40 may be capable of performing LPWA communication with another communication device (e.g., base station device 20, relay device 30, and another terminal device 40). In addition, the radio communication used by the terminal device 40 may be performed by using millimeter waves. The radio communication (including sidelink communication) used by the terminal device 40 may be performed by using radio waves, or by infrared rays or visible light (optical radio transmission).

Furthermore, the terminal device 40 may be a moving object device. Here, the moving object device is a movable radio communication device. In this case, the terminal device 40 may be a radio communication device installed in a moving object, or may be a moving object itself. For example, the terminal device 40 may be a vehicle that moves on a road, such as an automobile, a bus, a truck, and a motorcycle, or a radio communication device mounted on the vehicle. Note that the moving object may be a mobile terminal, or a moving object that moves on land (on ground in narrow sense), in the ground, on water, or under water. Furthermore, the moving object may be a moving object that moves in the atmosphere, such as a drone (aerial UE) and a helicopter, or a moving object that moves outside the atmosphere, such as an artificial satellite.

The terminal device 40 may be simultaneously connected to a plurality of base station devices or a plurality of cells to perform communication. For example, when one base station device can provide a plurality of cells, the terminal device 40 can perform carrier aggregation by using one cell as a pCell and using another cell as an sCell. Furthermore, when each of a plurality of base station devices 20 can provide one or a plurality of cells, the terminal device 40 can achieve dual connectivity (DC) by using one or a plurality of cells managed by one base station device (MN (e.g., MeNB or MgNB)) as a pCell or a pCell and an sCell(s) and using one or a plurality of cells managed by another base station device (Sn (e.g., SeNB or SgNB)) as a pCell or a pCell and an sCell(s). The DC may be referred to as a multi connectivity (MC).

Note that, when a communication area is supported via cells of different base station devices 20 (plurality of cells having different cell identifiers or the same cell identifier), communication between the base station device 20 and the terminal device 40 is made possible by bundling the plurality of cells by carrier aggregation (CA) technology, dual connectivity (DC) technology, or multi-connectivity (MC) technology. Alternatively, the terminal device 40 can communicate with the plurality of base station device 20 by coordinated multi-point transmission and reception (CoMP) technology via cells of different base station devices 20.

Note that the terminal device 40 is not necessarily required to be directly used by a person. The terminal device 40 may be a sensor installed in a machine of a factory and the like, as in so-called machine type communication (MTC). Furthermore, the terminal device 40 may be a machine to machine (M2M) device or an Internet of Things (IoT) device. Furthermore, the terminal device 40 may have a relay communication function as represented by device to device (D2D) and vehicle to everything (V2X). Furthermore, the terminal device 40 may be equipment called client premises equipment (CPE) used in a radio backhaul and the like.

Hereinafter, the configuration of each device constituting the communication system 1 according to the embodiment will be specifically described. Note that the configuration of each device described below is merely one example. The configuration of each device may be different from the following configuration.

2-2. Configuration of Management Device

Figure 7:
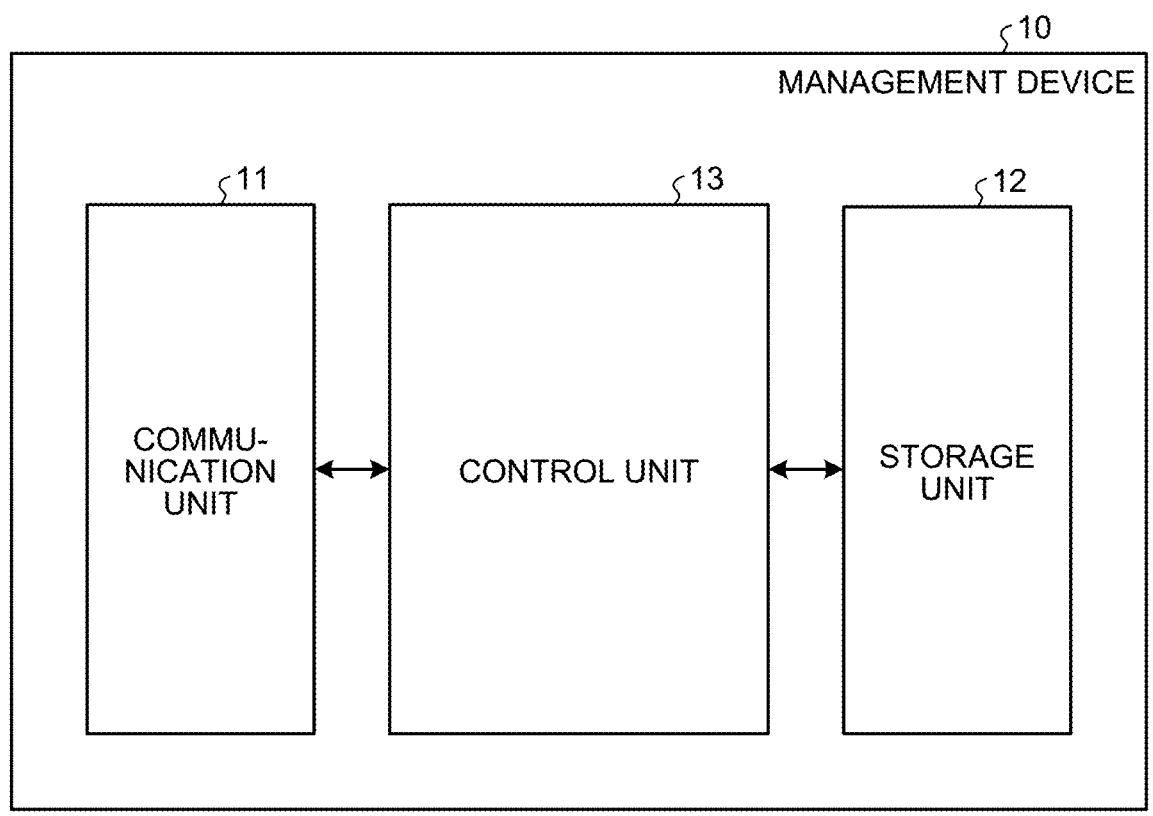
FIG. 7 illustrates a configuration example of a management device according to the embodiment of the present disclosure.

FIG. 7 illustrates a configuration example of the management device 10 according to the embodiment of the present disclosure. The management device 10 manages a radio network. The management device 10 includes a communication unit 11, a storage unit 12, and a control unit 13. Note that FIG. 7 illustrates a functional configuration, and the hardware configuration may be different from the configuration. Furthermore, the functions of the management device 10 may be dispersively implemented in a plurality of physically separated configurations. For example, the management device 10 may include a plurality of server devices.

The communication unit 11 is a communication interface for communicating with other devices. The communication unit 11 may be a network interface or an equipment connection interface. For example, the communication unit 11 may be a local area network (LAN) interface such as a network interface card (NIC), or may be a USB interface including a universal serial bus (USB) host controller, a USB port, and the like. Furthermore, the communication unit 11 may be a wired interface or a radio interface. The communication unit 11 functions as a communication instrument of the management device 10. The communication unit 11 communicates with the base station device 20 under the control of the control unit 13.

The storage unit 12 is a data readable/writable storage device such as a dynamic random access memory (DRAM), a static random access memory (SRAM), a flash memory, and a hard disk. The storage unit 12 functions as a storage instrument of the management device 10. The storage unit 12 stores, for example, a connection state of the terminal device 40. For example, the storage unit 12 stores a radio resource control (RRC) state and an EPS connection management (ECM) state of the terminal device 40. The storage unit 12 may function as a home memory that stores the position information on the terminal device 40.

The control unit 13 is a controller that controls each unit of the management device 10. For example, the control unit 13 is implemented by a processor such as a central processing unit (CPU) and a micro processing unit (MPU). For example, the control unit 13 is implemented by a processor executing various programs stored in a storage device in the management device 10 by using a random access memory (RAM) or the like as a work area. Note that the control unit 13 may be implemented by an integrated circuit such as an application specific integrated circuit (ASIC) and a field programmable gate array (FPGA). Any of the CPU, the MPU, the ASIC, and the FPGA can be regarded as a controller.

2-3. Configuration of Base Station Device

Figure 8:
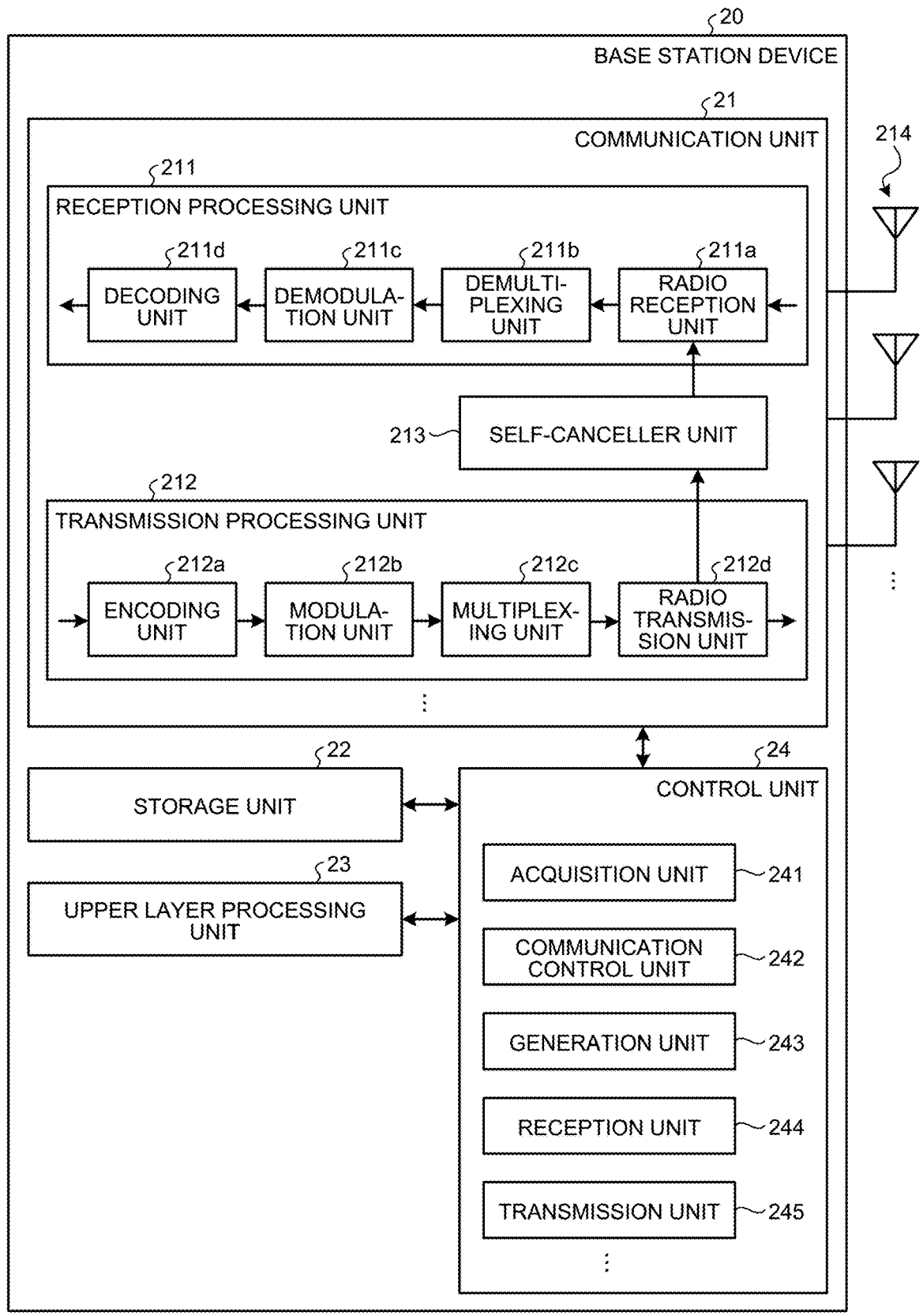
FIG. 8 illustrates a configuration example of a base station device according to the embodiment of the present disclosure.

Next, the configuration of the base station device 20 will be described. FIG. 8 illustrates a configuration example of the base station device 20 according to the embodiment of the present disclosure. The base station device 20 can simultaneously perform data transmission and data reception by using the same band. For example, the base station device 20 can perform in-band full duplex with another radio communication device such as the terminal device 40 and the relay device 30. The base station device 20 may be capable of performing NOMA communication with another radio communication device.

The base station device 20 includes a communication unit 21, a storage unit 22, an upper layer processing unit 23, and a control unit 24. Note that FIG. 8 illustrates a functional configuration, and the hardware configuration may be different from the configuration. Furthermore, the functions of the base station device 20 may be dispersively implemented in a plurality of physically separated configurations.

The communication unit 21 is a signal processing unit for wirelessly communicating with another radio communication device (e.g., terminal device 40, relay device 30, and another base station device 20). The communication unit 21 can simultaneously perform data transmission and data reception by using the same band. For example, the base station device 20 can perform in-band full duplex with another communication device such as the terminal device 40 and the relay device 30. The communication unit 21 operates under the control of the control unit 24. The communication unit 21 supports one or a plurality of radio access methods. For example, the communication unit 21 supports both NR and LTE. The communication unit 21 may support W-CDMA or cdma 2000 in addition to the NR or the LTE. Furthermore, the communication unit 21 may support communication using NOMA.

The communication unit 21 includes a reception processing unit 211, a transmission processing unit 212, a self-canceller unit 213, and an antenna 214. The communication unit 21 may include a plurality of reception processing units 211, a plurality of transmission processing units 212, and a plurality of antennas 214. Note that, when the communication unit 21 supports a plurality of radio access methods, each unit of the communication unit 21 can be individually configured for each radio access method. For example, the reception processing unit 211 and the transmission processing unit 212 may be individually configured by the LTE and the NR.

The reception processing unit 211 processes an uplink signal received via the antenna 214. The reception processing unit 211 includes a radio reception unit 211*a*, a demultiplexing unit 211*b*, a demodulation unit 211*c*, and a decoding unit 211*d*.

The radio reception unit 211*a* performs, on an uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 211*b* separates an uplink channel such as a physical uplink shared channel (PUSCH) and a physical uplink control channel (PUCCH) and an uplink reference signal from signals output from the radio reception unit 211*a*. The demodulation unit 211*c* demodulates a reception signal by using a modulation method such as binary phase shift keying (BPSK) and quadrature phase shift keying (QPSK) for a modulation symbol of the uplink channel. The modulation method used by the demodulation unit 211*c* may be 16 quadrature amplitude modulation (QAM), 64 QAM, or 256 QAM. In this case, signal points on a constellation is not necessarily required to be equidistant from each other. The constellation may be a non uniform constellation (NUC). The decoding unit 211*d* performs decoding processing on a demodulated encoded bit of the uplink channel. Decoded uplink data and uplink control information are output to the control unit 24.

The transmission processing unit 212 performs processing of transmitting downlink control information and downlink data. The transmission processing unit 212 includes an encoding unit 212*a*, a modulation unit 212*b*, a multiplexing unit 212*c*, and a radio transmission unit 212*d*.

The encoding unit 212*a* encodes downlink control information and downlink data input from the control unit 24 by using an encoding method such as block encoding, convolutional encoding, turbo encoding, and the like. Note that the encoding unit 212*a* may perform encoding with a polar code and encoding with a low density parity check code (LDPC code). The modulation unit 212*b* modulates an encoded bit output from the encoding unit 212*a* in a predetermined modulation method such as the BPSK, the QPSK, the 16 QAM, the 64 QAM, and the 256 QAM. In this case, signal points on a constellation is not necessarily required to be equidistant from each other. The constellation may be a non uniform constellation. The multiplexing unit 212*c* multiplexes a modulation symbol of each channel and a downlink reference signal, and places the multiplexed modulation symbol and the downlink reference signal to a predetermined resource element. The radio transmission unit 212*d* performs various pieces of signal processing on a signal from the multiplexing unit 212*c*. For example, the radio transmission unit 212*d* performs processing such as conversion into a time domain by fast Fourier transform, addition of a guard interval (cyclic prefix), generation of a baseband digital signal, conversion into an analog signal, quadrature modulation, up-conversion, removal of an extra frequency component, and power amplification. A signal generated by the transmission processing unit 212 is transmitted from the antenna 214.

The self-canceller unit 213 cancels self-interference given to data reception of the base station device 20 itself by data transmission of the base station device 20 itself. For example, the self-canceller unit 213 cancels self-interference in the case where the communication unit 21 performs in-band full duplex. For example, the self-canceller unit 213 removes influence of the transmission signal from the reception signal acquired by the reception processing unit 211 based on the transmission signal generated by the transmission processing unit 212.

The storage unit 22 is a data readable/writable storage device such as a DRAM, an SRAM, a flash memory, and a hard disk. The storage unit 22 functions as a storage instrument of the base station device 20.

The upper layer processing unit 23 is a communication interface for communicating with a node positioned at an upper level on a network (e.g., management device 10). For example, the upper layer processing unit 23 is a LAN interface such as an NIC. Furthermore, the upper layer processing unit 23 may be a wired interface or a radio interface. The upper layer processing unit 23 functions as a network communication instrument of the base station device 20.

The control unit 24 is a controller that controls each unit of the base station device 20. For example, the control unit 24 is implemented by a processor (hardware processor) such as a central processing unit (CPU) and a micro processing unit (MPU). For example, the control unit 24 is implemented by a processor executing various programs stored in a storage device in the base station device 20 by using a random access memory (RAM) or the like as a work area. Note that the control unit 24 may be implemented by an integrated circuit such as an application specific integrated circuit (ASIC) and a field programmable gate array (FPGA). Any of the CPU, the MPU, the ASIC, and the FPGA can be regarded as a controller.

As illustrated in FIG. 8, the control unit 24 includes an acquisition unit 241, a communication control unit 242, a generation unit 243, a reception unit 244, and a transmission unit 245. Each block (acquisition unit 241 to transmission unit 245) constituting the control unit 24 is a functional block exhibiting a function of the control unit 24. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. Any method of constituting a functional block can be adopted.

Note that the control unit 24 may include a functional unit different from the above-described functional blocks. Note that each block (acquisition unit 241 to transmission unit 245) constituting the control unit 24 may operate in a manner similar to that of each block constituting the control unit of the relay device 30. The configuration of the relay device 30 will be described later.

2-4. Configuration of Relay Device

Figure 9:
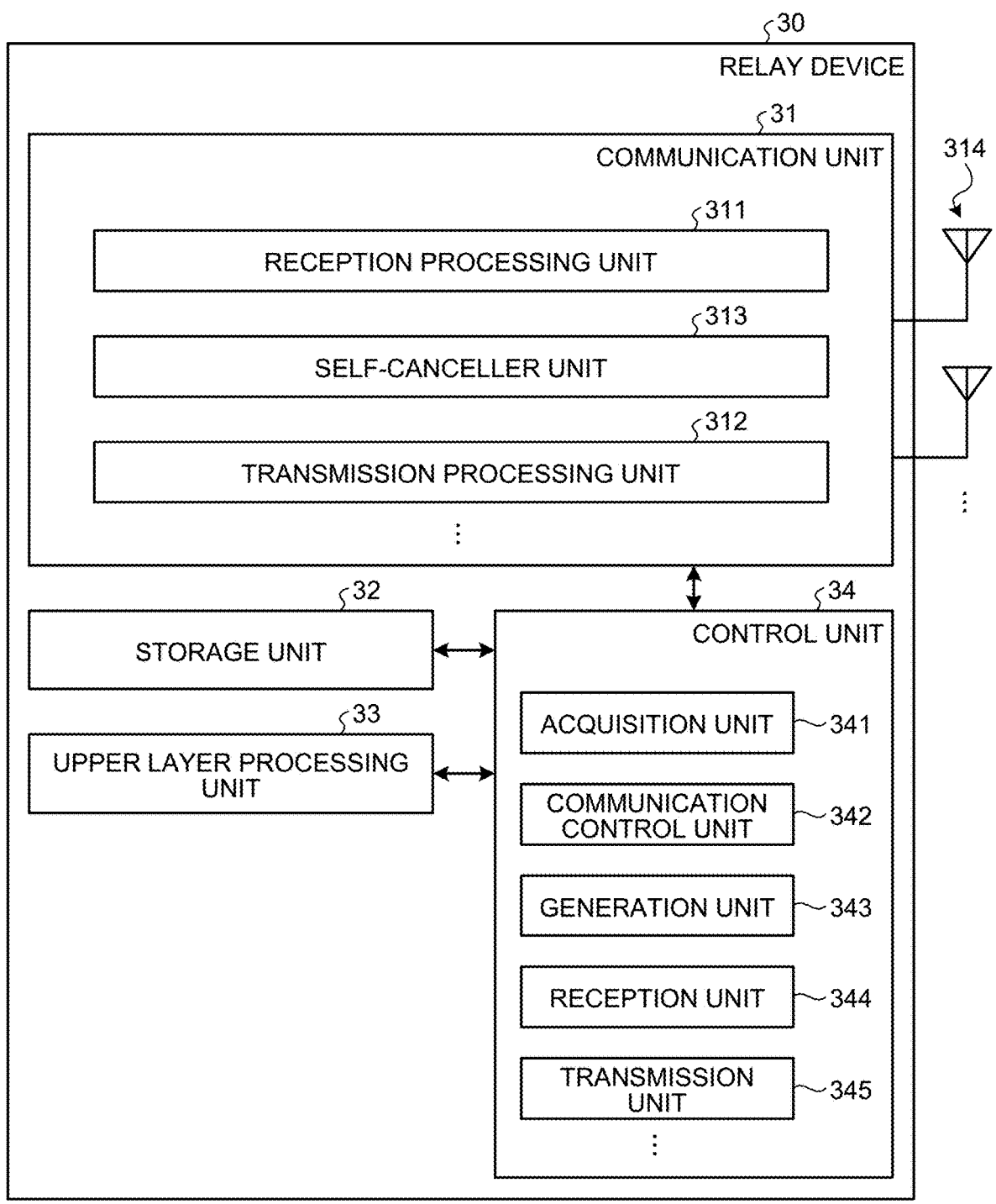
FIG. 9 illustrates a configuration example of a relay device according to the embodiment of the present disclosure.

Next, the configuration of the relay device 30 will be described. FIG. 9 illustrates a configuration example of the relay device 30 according to the embodiment of the present disclosure. The relay device 30 can simultaneously perform data transmission and data reception by using the same band. For example, the relay device 30 can perform in-band full duplex with another radio communication device such as the terminal device 40 and the relay device 30. The relay device 30 may be capable of performing NOMA communication with another radio communication device.

The relay device 30 includes a communication unit 31, a storage unit 32, an upper layer processing unit 33, and a control unit 34. Note that FIG. 9 illustrates a functional configuration, and the hardware configuration may be different from the configuration. Furthermore, the functions of the relay device 30 may be dispersively implemented in a plurality of physically separated configurations.

The communication unit 31 is a signal processing unit for wirelessly communicating with another radio communication device (e.g., base station device 20, terminal device 40, and another relay device 30). The communication unit 31 can simultaneously perform data transmission and data reception by using the same band. For example, the communication unit 31 can perform in-band full duplex with another communication device such as the base station device 20 and the terminal device 40. The communication unit 31 operates under the control of the control unit 34. The communication unit 31 supports one or a plurality of radio access methods. For example, the communication unit 41 supports both the NR and the LTE. The communication unit 31 may support W-CDMA or cdma 2000 in addition to the NR or the LTE. Furthermore, the communication unit 31 may support communication using NOMA.

The communication unit 31 includes a reception processing unit 311, a transmission processing unit 312, a self-canceller unit 313, and an antenna 314. The communication unit 31 may include a plurality of reception processing units 311, a plurality of transmission processing units 312, a plurality of self-canceller units 313, and a plurality of antennas 314. The communication unit 31, the reception processing unit 311, the transmission processing unit 312, the self-canceller unit 313, and the antenna 314 have configurations similar to those of the communication unit 21, the reception processing unit 211, the transmission processing unit 212, the self-canceller unit 213, and the antenna 214 of the base station device 20.

The storage unit 32 is a data readable/writable storage device such as a DRAM, an SRAM, a flash memory, and a hard disk. The storage unit 32 functions as a storage instrument of the relay device 30. The storage unit 32 has a configuration similar to that of the storage unit 22 of the base station device 20.

The upper layer processing unit 33 is a communication interface for communicating with a node positioned at an upper level on a network. For example, the upper layer processing unit 33 is a LAN interface such as an NIC. The upper layer processing unit 33 may be a wired interface or a radio interface. The upper layer processing unit 33 functions as a network communication instrument of the relay device 30. The upper layer processing unit 33 communicates with the base station device 20 under the control of the control unit 34.

The control unit 34 is a controller that controls each unit of the relay device 30. The control unit 34 is implemented by, for example, a processor (hardware processor) such as a CPU and an MPU. For example, the control unit 34 is implemented by a processor executing various programs stored in a storage device in the relay device 30 by using a RAM and the like as a work area. Note that the control unit 34 may be implemented by an integrated circuit such as an ASIC and an FPGA. Any of the CPU, the MPU, the ASIC, and the FPGA can be regarded as a controller.

As illustrated in FIG. 9, the control unit 34 includes an acquisition unit 341, a communication control unit 342, a generation unit 343, a reception unit 344, and a transmission unit 345. Each block (acquisition unit 341 to transmission unit 345) constituting the control unit 34 is a functional block exhibiting a function of the control unit 34. These functional blocks may be software blocks or hardware blocks. For example, each of the above-described functional blocks may be one software module implemented by software (including microprogram), or may be one circuit block on a semiconductor chip (die). Of course, each functional block may be one processor or one integrated circuit. Any method of constituting a functional block can be adopted.

Note that the control unit 34 may include a functional unit different from the above-described functional blocks. Note that each block (acquisition unit 341 to transmission unit 345) constituting the control unit 34 may operate in a manner similar to that of each block (acquisition unit 241 to transmission unit 245) constituting the control unit 24 of the base station device 20.

Figure 10:
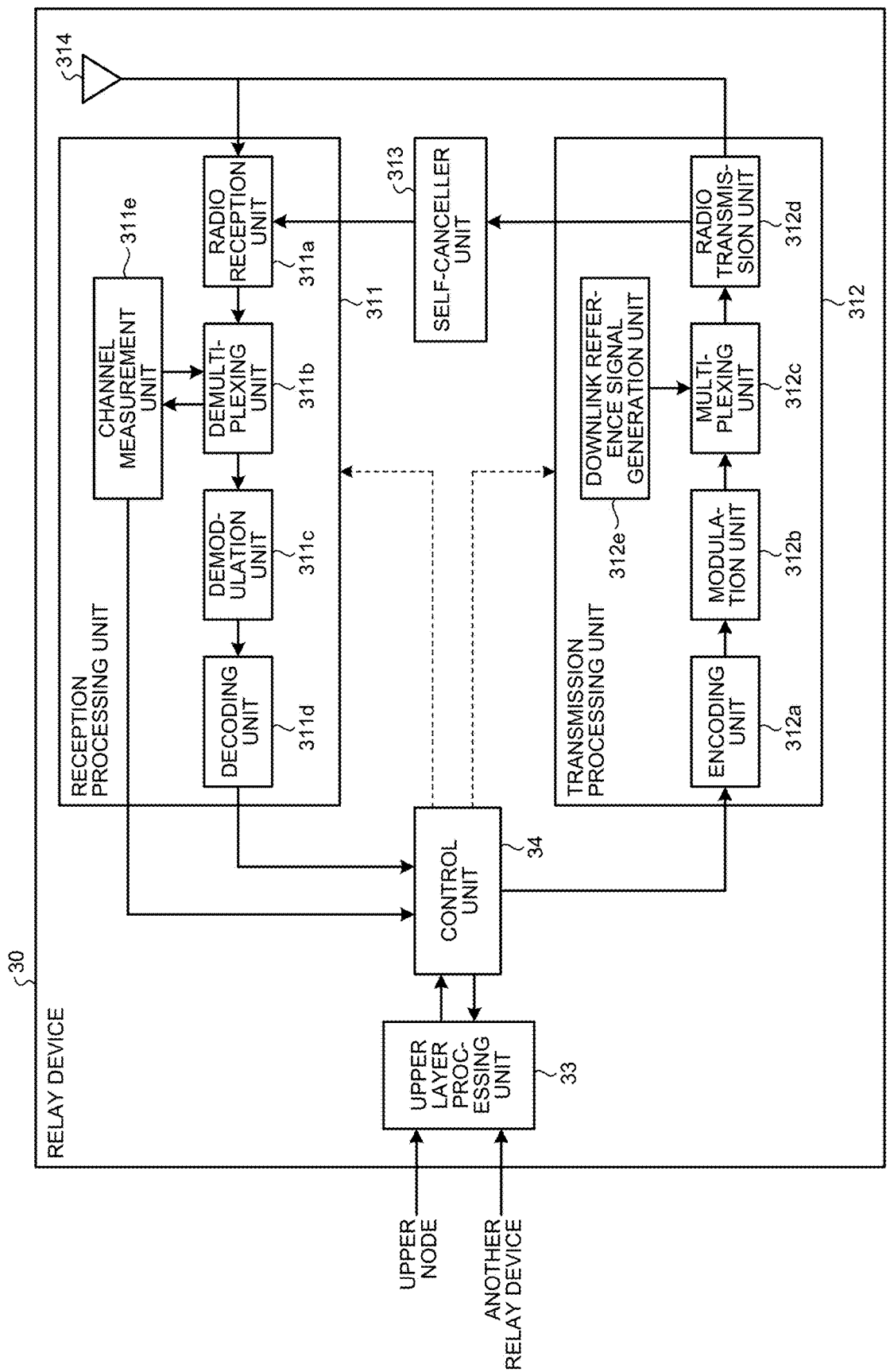
FIG. 10 illustrates a specific configuration example around signal processing of the relay device.

FIG. 10 illustrates a specific configuration example around signal processing of the relay device 30. The relay device 30 in FIG. 10 includes the reception processing unit 311, the transmission processing unit 312, the self-canceller unit 313, the antenna 314, the storage unit 32, the upper layer processing unit 33, and the control unit 34.

The reception processing unit 311 processes an uplink signal received via the antenna 314. The reception processing unit 311 includes a radio reception unit 311$a$, a demultiplexing unit 311$b$, a demodulation unit 311$c$, a decoding unit 311$d$, and a channel measurement unit 311$e$. The channel measurement unit 311$e$ measures the state of a channel based on a processing result of the demultiplexing unit 311$b$, and outputs the measurement result to the demultiplexing unit 311$b$ and the control unit 34. The radio reception unit 311$a$, the demultiplexing unit 311$b$, the demodulation unit 311$c$, and the decoding unit 311$d$ have functions similar to those of the radio reception unit 211$a$, the demultiplexing unit 211$b$, the demodulation unit 211$c$, and the decoding unit 211$d$ of the base station device 20.

The transmission processing unit 312 performs processing of transmitting downlink control information and downlink data. The transmission processing unit 312 includes an encoding unit 312$a$, a modulation unit 312$b$, a multiplexing unit 312$c$, a radio transmission unit 312$d$, and a downlink reference signal generation unit 312$e$. The downlink reference signal generation unit 312$e$ generates a downlink reference signal to be transmitted to a lower node on a network. The encoding unit 312$a$, the modulation unit 312$b$, the multiplexing unit 312$c$, and the radio transmission unit 312$d$ have configurations similar to the functions of the encoding unit 212$a$, the modulation unit 212$b$, the multiplexing unit 212$c$, and the radio transmission unit 212$d$ of the base station device 20.

The self-canceller unit 313 cancels self-interference given to data reception of the relay device 30 itself by data transmission of the relay device 30 itself. For example, the self-canceller unit 313 cancels self-interference in the case where the communication unit 31 performs in-band full duplex. For example, the self-canceller unit 313 removes influence of the transmission signal from the reception signal acquired by the radio reception unit 311a based on the transmission signal generated by the radio transmission unit 312d.

2-5. Configuration of Terminal Device

Figure 11:
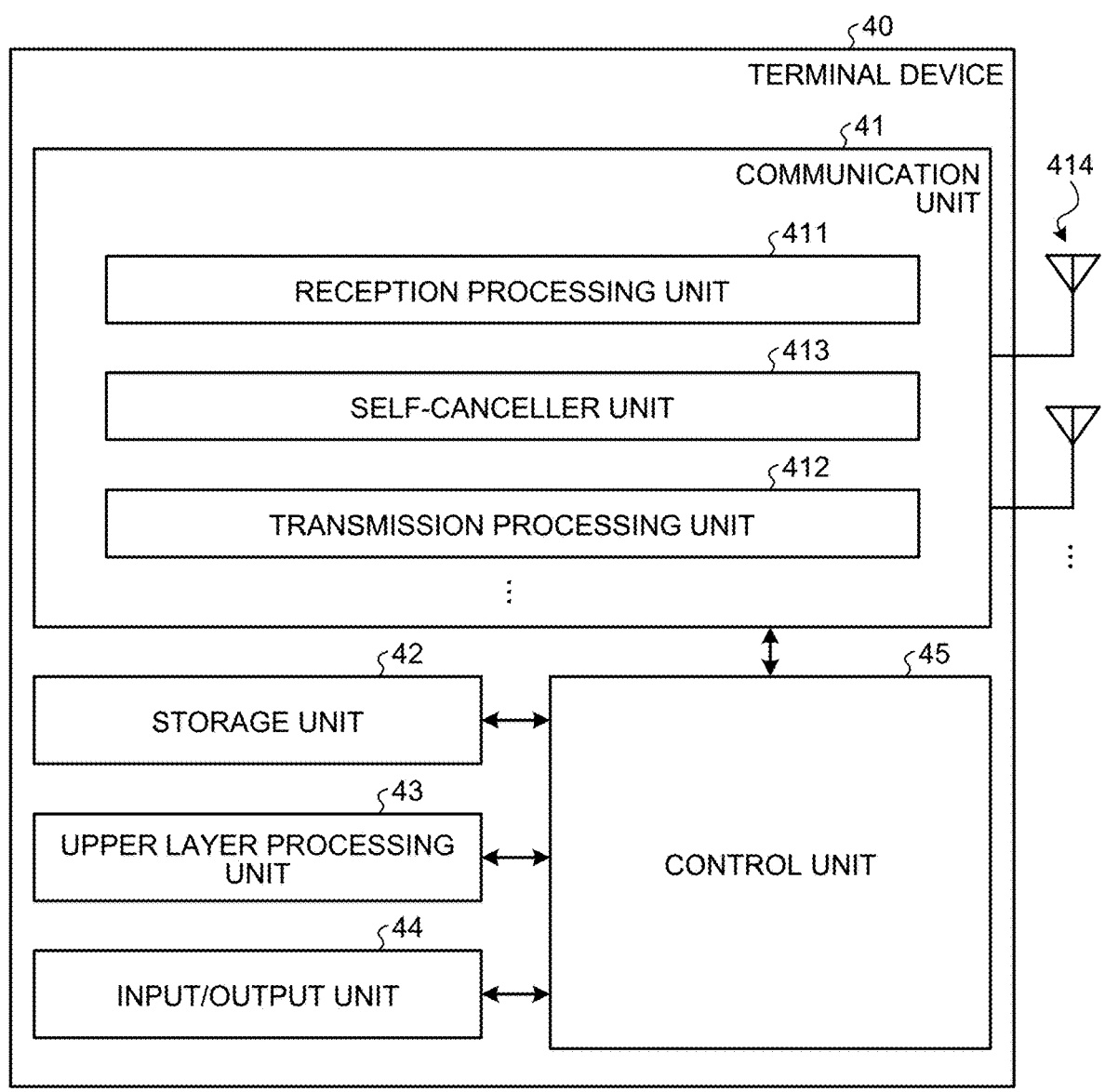
FIG. 11 illustrates a configuration example of a terminal device according to the embodiment of the present disclosure.

Next, the configuration of the terminal device 40 will be described. FIG. 11 illustrates a configuration example of the terminal device 40 according to the embodiment of the present disclosure. The terminal device 40 can simultaneously perform data transmission and data reception by using the same band. For example, the terminal device 40 can perform in-band full duplex with another radio communication device such as the base station device 20 and the relay device 30. The terminal device 40 may be capable of performing NOMA communication with another radio communication device.

The terminal device 40 includes a communication unit 41, a storage unit 42, an upper layer processing unit 43, an input/output unit 44, and a control unit 45. Note that FIG. 11 illustrates a functional configuration, and the hardware configuration may be different from the configuration. Furthermore, the functions of the terminal device 40 may be dispersively implemented in a plurality of physically separated configurations. Note that, in the configuration of the terminal device 40, the upper layer processing unit 43 and the input/output unit 44 are not required to be essential components.

The communication unit 41 is a signal processing unit for wirelessly communicating with another radio communication device (e.g., base station device 20, relay device 30, and terminal device 40). The communication unit 41 can simultaneously perform data transmission and data reception by using the same band. For example, the communication unit 31 can perform in-band full duplex with another communication device such as the base station device 20 and the terminal device 40. The communication unit 41 operates under the control of the control unit 45. The communication unit 41 supports one or a plurality of radio access methods. For example, the communication unit 41 supports both the NR and the LTE. The communication unit 41 may support W-CDMA or cdma 2000 in addition to the NR or the LTE. Furthermore, the communication unit 41 may support communication using NOMA.

The communication unit 41 includes a reception processing unit 411, a transmission processing unit 412, a self-canceller unit 413, and an antenna 414. The communication unit 41 may include a plurality of reception processing units 411, a plurality of transmission processing units 412, a plurality of self-canceller units 413, and a plurality of antennas 414. The communication unit 41, the reception processing unit 411, the transmission processing unit 412, the self-canceller unit 413, and the antenna 414 have configurations similar to those of the communication unit 21, the reception processing unit 211, the transmission processing unit 212, the self-canceller unit 213, and the antenna 214 of the base station device 20.

The storage unit 42 is a data readable/writable storage device such as a DRAM, an SRAM, a flash memory, and a hard disk. The storage unit 42 functions as a storage instrument of the terminal device 40. The storage unit 42 stores "information regarding transmission from an unconnected state (unconnected transmission information)" acquired from the base station device 20. The "information regarding transmission from an unconnected state (unconnected transmission information)" will be described in detail later.

The upper layer processing unit 43 is a communication interface for communicating with a node positioned at an upper level on a network. For example, the upper layer processing unit 43 is a LAN interface such as an NIC. The upper layer processing unit 43 may be a wired interface or a radio interface. The upper layer processing unit 43 functions as a network communication instrument of the terminal device 40. The upper layer processing unit 43 communicates with another device under the control of the control unit 45.

The input/output unit 44 is a user interface for communicating information with a user. For example, the input/output unit 44 is an operation device for the user to perform various operations, such as a keyboard, a mouse, an operation key, and a touch panel. Alternatively, the input/output unit 44 is a display device such as a liquid crystal display and an organic electroluminescence (EL) display. The input/output unit 44 may be an acoustic device such as a speaker and a buzzer. Furthermore, the input/output unit 44 may be a lighting device such as a light emitting diode (LED) lamp. The input/output unit 44 functions as an input/output instrument (input instrument, output instrument, operation instrument, or notification instrument) of the terminal device 40.

The control unit 45 is a controller that controls each unit of the terminal device 40. The control unit 45 is implemented by, for example, a processor (hardware processor) such as a CPU and an MPU. For example, the control unit 45 is implemented by a processor executing various programs stored in a storage device in the terminal device 40 by using a RAM and the like as a work area. Note that the control unit 45 may be implemented by an integrated circuit such as an ASIC and an FPGA. Any of the CPU, the MPU, the ASIC, and the FPGA can be regarded as a controller. The control unit 45 may have a configuration similar to the configuration of the control unit 34 of the relay device 30.

Figure 12:
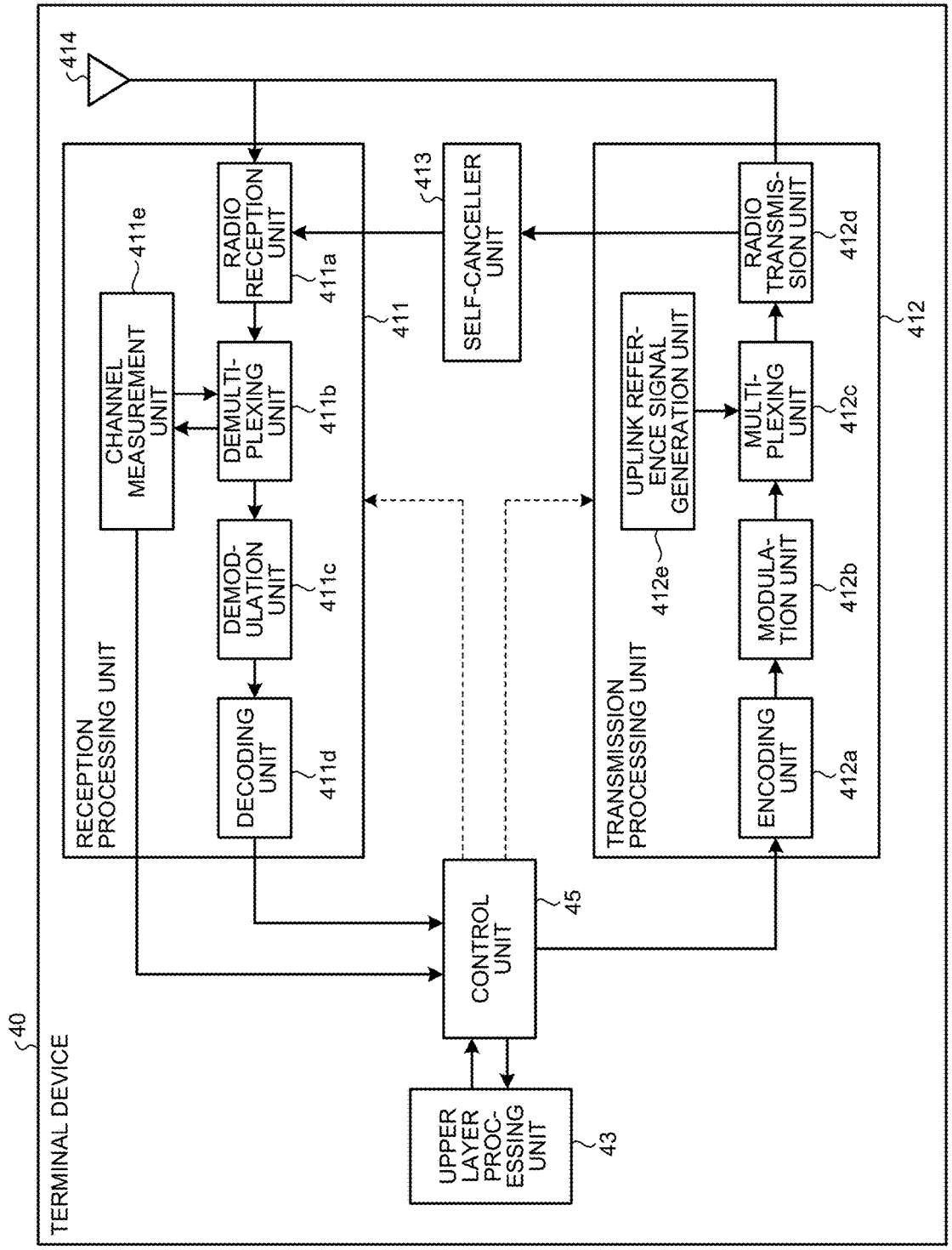
FIG. 12 illustrates a specific configuration example around signal processing of the terminal device.

FIG. 12 illustrates a specific configuration example around signal processing of the terminal device 40. The terminal device 40 in FIG. 12 includes the reception processing unit 411, the transmission processing unit 412, the self-canceller unit 413, the antenna 414, the storage unit 42, the upper layer processing unit 43, and the control unit 45.

The reception processing unit 411 processes a downlink signal received via the antenna 414. The reception processing unit 411 includes a radio reception unit 411a, a demultiplexing unit 411b, a demodulation unit 411c, a decoding unit 411d, and a channel measurement unit 411e. The channel measurement unit 411e measures the state of a channel based on a processing result of the demultiplexing unit 411b, and outputs the measurement result to the demultiplexing unit 411b and the control unit 34. The radio reception unit 411a, the demultiplexing unit 411b, the demodulation unit 411c, and the decoding unit 411d have functions similar to those of the radio reception unit 211a, the demultiplexing unit 211b, the demodulation unit 211c, and the decoding unit 211d of the base station device 20.

The transmission processing unit 412 performs processing of transmitting uplink control information and uplink data. The transmission processing unit 412 includes an encoding unit 412a, a modulation unit 412b, a multiplexing unit 412c, a radio transmission unit 412d, and an uplink reference signal generation unit 412e. The uplink reference signal generation unit 412e generates an uplink reference signal to be transmitted to an upper node on a network. The encoding unit 412a, the modulation unit 412b, the multiplexing unit 412c, and the radio transmission unit 412d have configurations similar to the functions of the encoding unit 212a, the modulation unit 212b, the multiplexing unit 212c, and the radio transmission unit 212d of the base station device 20.

The self-canceller unit 413 cancels self-interference given to data reception of the terminal device 40 itself by data transmission of the terminal device 40 itself. For example, the self-canceller unit 413 cancels self-interference in the case where the communication unit 41 performs in-band full duplex. For example, the self-canceller unit 413 removes influence of the transmission signal from the reception signal acquired by the radio reception unit 411a based on the transmission signal generated by the radio transmission unit 412d.

2-6. Configuration of Assumed System

Figure 13:
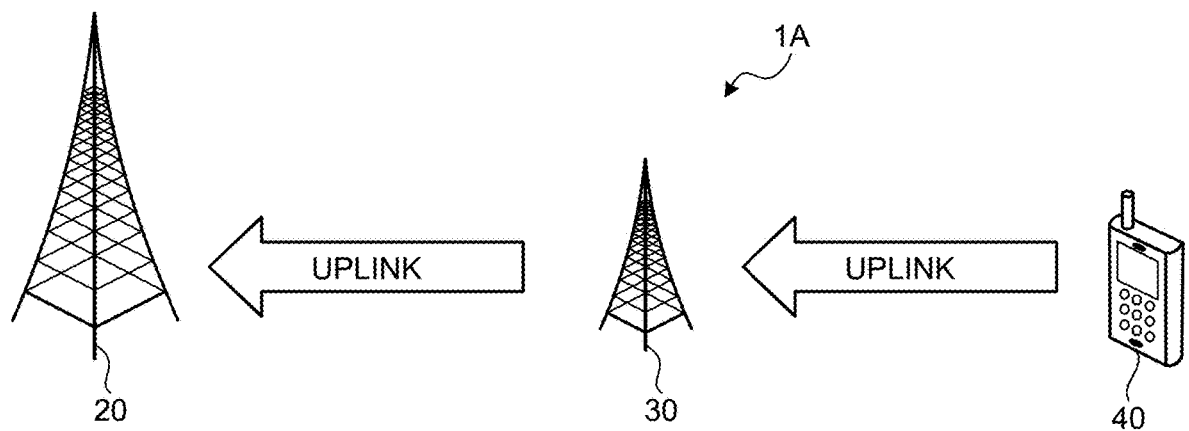
FIG. 13 illustrates a first communication system.
Figure 14:
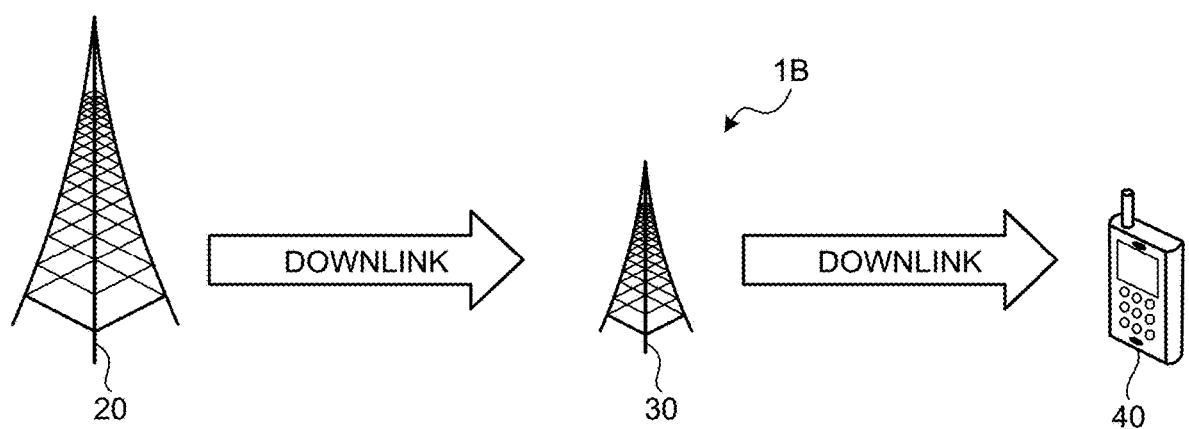
FIG. 14 illustrates a second communication system.
Figure 15:
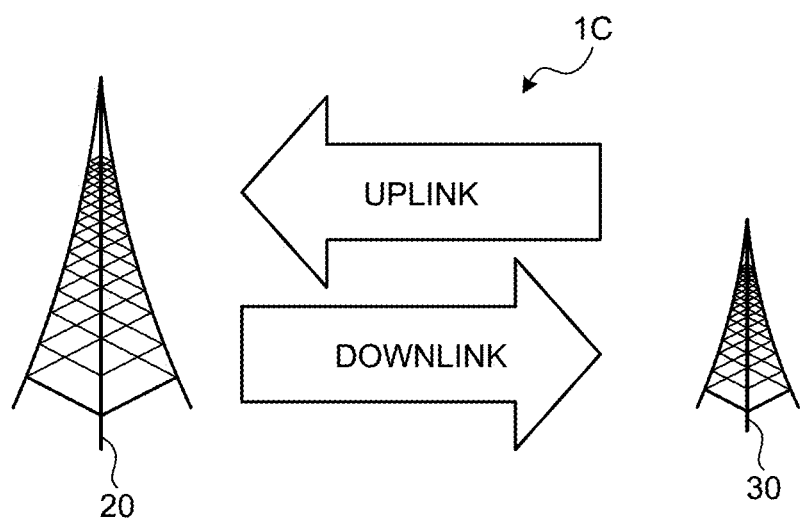
FIG. 15 illustrates a third communication system.

In the embodiment, the following three full-duplex systems are assumed as the communication system 1.
(1) First communication system (assumed system 1A)
(2) Second communication system (assumed system 1B)
(3) Third communication system (assumed system 1C)
(1) First Communication System (Assumed System 1A)
FIG. 13 illustrates a first communication system. The assumed system 1A performs in-band full duplex using both a backhaul link and an access link. In the example of FIG. 13, the communication system 1A performs multiplexing of an uplink backhaul link (link in uplink direction of backhaul link) and an uplink access link (link in uplink direction of access link). In the example of FIG. 13, the relay device 30 simultaneously performs data transmission in the uplink backhaul link (hereinafter, referred to as uplink backhaul link transmission) and data reception in the uplink access link (referred to as uplink access link reception) by using the same band.
(2) Second Communication System (Assumed System 2A)
FIG. 14 illustrates a second communication system. The assumed system 1B performs in-band full duplex using both a backhaul link and an access link. In the example of
FIG. 14, the assumed system 2A performs multiplexing of a downlink backhaul link (link in downlink direction of backhaul link) and a downlink access link (link in downlink direction of access link). In the example of FIG. 14, the relay device 30 simultaneously performs data reception in the downlink backhaul link (hereinafter, referred to as downlink backhaul link reception) and data transmission in the downlink access link (referred to as downlink access link reception) by using the same band.
(3) Third Communication System (Assumed System 1C)
FIG. 15 illustrates a third communication system. The assumed system 1C performs in-band full duplex using a backhaul link or an access link. In the example of FIG. 15, the communication system 1C performs multiplexing of an uplink backhaul link and a downlink backhaul link. In the example of FIG. 15, the relay device 30 simultaneously performs the uplink backhaul link transmission and the downlink backhaul link reception by using the same band.

3. Self-Interference from Uplink Backhaul Link Transmission to Uplink Access Link Reception Communication control regarding self-interference from uplink backhaul link transmission to uplink access link reception will be described. The communication control is applied to, for example, the communication control of the above-described assumed system 1A in FIG. 13.

Note that the communication control described below may be applied to the communication control of the above-described communication system 1C in FIG. 15. In this case, the uplink backhaul link and the uplink access link described below are appropriately replaced with an uplink or a downlink.

3-1. Resources Usable for Full Duplex in Full Duplex Relay System

First, resources usable for in-band full duplex will be described.

Before describing the resources usable for in-band full duplex, the types of the resource state in the NR will be described. Note that the resource state is not limited to the resource state in the NR.

Types of Resource State

In the NR, the following three types of resource states can be set. Note that, when the embodiment is carried out, a resource state (e.g., resource state designating sidelink) other than the following three types may be defined.
(1) UL (uplink)
(2) DL (downlink)
(3) Flexible
Hereinafter, each of (1) to (3) will be described.
(1) UL (Uplink)
When UL is set as a type of a resource state, it is indicated that the resource can transmit an uplink channel/signal in the terminal device 40. Furthermore, when UL is set as a type of a resource state, it is indicated that the resource may receive an uplink channel/signal in the base station device 20.
(2) DL (Downlink)
When DL is set as a type of a resource state, it is indicated that the resource expects to receive a downlink channel/signal in the terminal device 40. Furthermore, when DL is set as a type of a resource state, it is indicated that the resource may transmit a downlink channel/signal in the base station device 20.
(3) Flexible
When Flexible is set as a type of a resource state, it is indicated that the resource does not perform both transmission of an uplink channel/signal and reception of a downlink channel/signal in the terminal device 40 if the resource is not indicated as another resource state. When the resource is indicated as another resource state, the terminal device 40 performs operation of the indicated resource state.

Resource Usable for In-Band Full Duplex in UL

As an example in which a downlink access link can be allocated to an uplink backhaul link, a case in which the relay device 30 sets UL for a backhaul and UL and Flexible for an access link by RRC signaling from the base station device 20 is assumed.

As an example in which an uplink backhaul link can be allocated to an uplink access link, a case in which the relay device 30 sets UL for an access link and any of soft UL, soft DL, and Flexible for a backhaul by RRC signaling from the base station device 20 is assumed.

Note that the resource set with the soft UL can be set to UL, DL, or Flexible by an instruction from the base station device 20 or the like, and, when an instruction is not given, the resource is set as UL.

Furthermore, the resource set with the soft DL can be set to UL, DL, or Flexible by an instruction from the base station device 20 or the like, and, when an instruction is not given, the resource is set as DL.

3-2. Object Controlled Based on Information Regarding Self-Interference

Next, an object controlled based on information regarding self-interference will be described.

The following can be assumed as an object controlled based on information regarding self-interference (e.g., self-interference amount).

(1) Transmission power
(2) Beamforming
(3) Radio resources
(4) Modulation and coding scheme (MCS)

Hereinafter, each of (1) to (4) will be described.

(1) Transmission Power

For example, a communication device (e.g., relay device 30) that performs in-band full duplex controls transmission power in the in-band full duplex based on information regarding self-interference. As a result, the communication device can reduce power of self-interference that wraps a reception circuit around when a signal is transmitted.

(2) Beamforming

For example, a communication device (e.g., relay device 30) that performs in-band full duplex controls beamforming of data transmission in the in-band full duplex based on information regarding self-interference. The communication device can reduce power of self-interference that wraps a reception circuit around by controlling a transmission beam in a direction different from that of a reception beam.

(3) Radio Resources

For example, a communication device (e.g., relay device 30) that performs in-band full duplex controls radio resources (e.g., resource block and symbol length) used for data transmission in the in-band full duplex based on information regarding self-interference. For example, the communication device can achieve high-quality in-band full duplex by controlling a radio resource amount in accordance with a self-interference amount and adjusting a coded rate so that reception can be performed even with a low signal to interference plus noise ratio (SINR).

(4) Modulation and Coding Scheme (MCS)

For example, a communication device (e.g., relay device 30) that performs in-band full duplex controls radio resources (e.g., resource block and symbol length) used for data transmission in the in-band full duplex based on information regarding self-interference. For example, the communication device can achieve high-quality in-band full duplex by controlling the MCS in accordance with the self-interference amount and adjusting the coded rate so that reception can be performed even with a low SINR.

3-3. Method of Calculating Self-Interference Amount

A self-interference amount of the relay device 30 is assumed as information regarding the self-interference. Hereinafter, a method of calculating a self-interference amount will be described.

When the relay device 30 calculates the self-interference amount, the relay device 30 can calculate the self-interference amount by using the following resources.

(1) UL resource of backhaul link
(2) DL resource of access link

Hereinafter, each of (1) and (2) will be described.

(1) UL Resource of Backhaul Link

For example, the relay device 30 can measure a self-interference amount (self-interference power) by using transmission resources of a sounding reference signal (SRS).

For example, when the surrounding cells/terminals are adjusted so as not to transmit a signal with the same resource, the relay device 30 can calculate a self-interference amount (self-interference power) by subtracting measured power from transmission power (i.e., by "transmission power−measured power").

In contrast, when the surrounding cells/terminals can also transmit a signal with the same resource, the relay device 30 can calculate the self-interference amount (self-interference power) by subtracting measured power and interference power between a cell and a terminal from transmission power (i.e., "transmission power−measured power−interference power between a cell and a terminal").

(2) DL Resource of Access Link

For example, the relay device 30 can measure self-interference by using resources set with a zero power channel state information reference signal (ZP CSI-RS). In this case, the relay device 30 transmits an uplink channel/signal at the same timing as the ZP CSI-RS resources. The ZP CSI-RS resources for measuring interference are also referred to as a channel state information interference measurement (CSI-IM) resources.

For example, when the surrounding cells/terminals are adjusted so as not to transmit a signal with the same resource, the relay device 30 can calculate a self-interference amount (self-interference power) by subtracting measured power from transmission power (i.e., by "transmission power −measured power").

In contrast, when the surrounding cells/terminals can also transmit a signal with the same resource, the relay device 30 can calculate the self-interference amount (self-interference power) by subtracting measured power and interference power between a cell and a terminal from transmission power (i.e., "transmission power−measured power−interference power between a cell and a terminal").

3-4. Transmission Power Control Object (1): Uplink Backhaul Link

The relay device 30 performs transmission control (e.g., transmission power control) of an uplink backhaul link based on information regarding self-interference so as not to interfere with an uplink access link and an uplink backhaul link of the subsequent stage.

In this case, the relay device 30 may perform the transmission control of an uplink backhaul link based on an instruction from the base station device 20 generated based on information regarding the self-interference. The control method will be described in detail in <5. Method 1: Control Performed by Parent Node> described later. Note that, in the following description, a device (e.g., base station device 20), on a network, upper-ranked than a communication device (e.g., relay device 30) that performs data transmission by in-band full duplex may be referred to as a parent node.

The relay device 30 may perform the transmission power control of an uplink backhaul link by determination of the relay device 30 itself based on information regarding self-interference. The control method will be described in detail in <6. Method 2: Control by Determination of Child Node Itself> described later. Note that, in the following description, a communication device (e.g., relay device 30) that performs data transmission by in-band full duplex may be referred to as a child node.

3-5. Transmission Power Control Object (2): Uplink Access Link

The relay device 30 performs transmission control (e.g., scheduling) of an uplink access link based on information regarding self-interference (e.g., self-interference amount caused by backhaul link). The control method will be described in detail in <7. Self-Interference from Downlink Access Link Transmission to Downlink Backhaul Link Reception> described later.

4. Transmission Power Control Object (1) Method 1: Control Performed by Parent Node First, a method 1 will be described. In the method 1, the relay device 30 performs transmission power control of an uplink backhaul link based on an instruction from the base station device 20 generated based on information regarding self-interference. For example, in the relay device 30, transmission power of an uplink backhaul link is controlled by scheduling from a parent node (e.g., base station device 20).

4-1. Report of Information Regarding Self-Interference to Parent Node

In order to allow a parent node to control data transmission of the relay device 30, the relay device 30 transmits information regarding self-interference (e.g., self-interference amount) to the parent node. The following method is assumed as a reporting method.

4-1-1. Reporting Method 1: Report Performed by Power Head Room

First, as a reporting method, report performed by a power head room is conceivable. The power head room is, for example, information for indicating remaining power of transmission power of the relay device 30 (hereinafter, also referred to as information on remaining power of transmission power). In this case, the power head room may be corrected based on the interference amount of self-interference. For example, the relay device 30 may calculate the power head room by adding or subtracting a back-off (correction coefficient) in accordance with the interference amount from the maximum transmission power. The relay device 30 may then report the calculated power head room to the parent node.

Note that, as a specific example of the power head room, an expression of Type 1 PH is represented in the following expression (1).

$$PH_{type1,b,f,c}(i, j, q_d, l) = \tag{1}$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}$$

The meaning of each variable in the expression (1) is as follows.

$P_{CMAX,f,c}(i)$: maximum transmission power with respect to frequency of serving cell
$P_{O\_PUSCH,b,f,c}(j)$: aimed reception power set in upper layer
$M_{RB,b,f,c}^{PUSCH}(i)$: bandwidth to which PUSCH resources are allocated
$\alpha_{b,f,c}(j)$: path loss correction coefficient
$PL_{b,f,c}(q_d)$: path loss
$\Delta_{TF,b,f,c}(i)$: correction coefficient corresponding to MCU of PUSCH
$f_{b,f,c}(i, l)$: open-loop power control coefficient
i: PUSCH transmission occasion
j: parameter set configuration with index
where $j \in \{0, 1, \ldots, J-1\}$
b: active UL BWP
f: carrier
c: serving cell Note that an expression of the PH (e.g., referred to as Type 4 PH) to which the full duplex is applied is, for example, the following expression (2).

$$PH_{type1,b,f,c}(i, j, q_d, l) = \tag{2}$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\} - FD(i)$$

In the expression (2), FD(i) represents a correction coefficient calculated based on the self-interference amount at the time of transmission with assumed transmission power.

4-1-2. Reporting Method 2: Report Performed by Overload Indicator

Next, as a reporting method, report performed by an overload indicator is conceivable.

The overload indicator is signaling used in an X2 interface. A communication device can tell an adjacent cell an interfered amount in a predetermined frequency at three levels of information of Low, Mid, and High by using the overload indicator.

The relay device 30 reports the overload indicator including the self-interference amount to the parent node.

4-1-3. Reporting Method 3: Report as One Piece of Information of CSI Feedback Next, as a reporting method, a method of performing reporting as one piece of information of channel state information (CSI) feedback is conceivable. The CSI is information indicating channel information (hereinafter, also referred to as channel state information).

For example, the relay device 30 reports information on interference from the surroundings including self-interference information to the parent node. In this case, the relay device 30 may feed back two types of information of CSI corresponding to the in-band full duplex and CSI corresponding to non-full duplex to the parent node (e.g., base station device 20. Here, the non-full duplex indicates communication that is not the in-band full duplex. In this case, here, the CSI corresponding to the in-band full duplex is reported including the self-interference information. In contrast, the CSI corresponding to the non-full duplex does not include the self-interference information.

The relay device 30 may report self-interference information to the parent node separately from the information on interference from the surroundings. In this case, the relay device 30 reports CSI (conventional CSI) corresponding to the non-full duplex, and reports additional information necessary for achieving the in-band full duplex in addition to the conventional CSI. Here, the non-full duplex indicates communication that is not the in-band full duplex. The additional information is, for example, additional interference information (cross-link interference including self-interference) in an in-band full duplex environment.

Examples of the information on interference from the surroundings in a CSI feedback include a channel quality indicator (CQI), an L1 reference signal received quality (L1-RSRQ), an L1 received signal strength indicator (L1-RSSI), and the like.

4-1-4. Reporting Method 4: Reporting Uplink Transmission Power+Interference Cancellation Capability Next, as a reporting method, reporting uplink transmission power and interference cancellation capability is assumed. The parent node (base station device 20) can estimate the self-interference amount of the relay device 30 by subtracting the interference cancellation capability from the uplink transmission power.

As a method of notifying the parent node of the interference cancellation capability, it is conceivable that the relay device 30 makes notification of capability information regarding the interference cancellation capability of the relay device 30 itself. The capability information is, for example, a capability index associated with a predetermined cancellation capability. Table 1 illustrates one example of the correspondence between the capability index and the cancellation capability. The relay device 30 makes notification of the interference cancellation capability of the relay device 30 itself by capability information that guarantees a predetermined interference cancellation performance. Note that a plurality of capabilities for a plurality of interference cancellation performances may be defined.

TABLE 1

One Example of Correspondence Between Capability Index and Cancellation Capability

| Capability index | Cancellation capability |
|---|---|
| 1 | −130 dB |
| 2 | −120 dB |
| 3 | −110 dB |
| 4 | −100 dB |
| ... | ... |

The relay device 30 may makes notification of an interference cancellation amount. For example, the relay device 30 may make notification of an attenuation amount that can be reduced by interference cancellation in dB.

The base station device 20 estimates the self-interference amount of the relay device 30 based on information on uplink transmission power and information on interference cancellation capability, and generates an instruction regarding transmission power control to the relay device 30 based on the estimation result.

4-1-5. Reporting Method 5: Reporting Calculated Self-Interference Amount

The relay device 30 may report the calculated self-interference amount. In this case, the relay device 30 may report the self-interference amount to the parent node independently of another piece of control information.

4-1-6. Information Regarding Self-Interference to Be Reported

The following pieces of information can be assumed as "information regarding self-interference" to be reported to the parent node by using the above-described reporting methods 1 to 5 and the like.
(1) Interference Amount
(2) Information on Resources That Receive Interference
(3) Information Regarding Beam Hereinafter, each of (1) to (3) will be described.
(1) Interference Amount The interference amount is quantized interference power information. Here, the interference power information may relate to quantized self-interference power. For example, if two levels are used, Low and High are assumed as the quantized interference power information. Furthermore, if three levels are used, Low, Mid, and High are assumed as the quantized interference power information. Of course, the number of levels is not limited to two or three. More than three levels of interference power information may be used.

(2) Information on Resources That Receive Interference

Information on resources that receive interference and information on time and frequency will be described. The resources that receive interference are represented by, for example, resource blocks or slots/symbols. Furthermore, the resources may be represented by the same information as downlink control information (DCI). For example, the resources may be represented by a resource indication value (RIV) and a start and length indicator value (SLIV). Here, the RIV represents a combination of the head and the rear of resources on a frequency axis. Furthermore, the SLIV represents a combination of the head and the length of resources on a time axis.

(3) Information Regarding Beam

The following (a) to (d) are assumed as information regarding a beam.

(a) Information regarding uplink transmission beam of backhaul link and/or uplink reception beam of access link (b) Information regarding uplink transmission antenna (panel) of backhaul link and/or uplink reception antenna (panel) of access link (c) Information regarding SRS resource indicator (SRI) or PRACH occasion of backhaul link and/or synchronization signal block (SSB) index or CSI-RS index of access link (d) Information regarding uplink antenna port of backhaul link and/or downlink antenna port of access link The self-interference amount varies depending on a combination of transmission and reception of beams or panels. Therefore, a parent node (e.g., base station device 20) calculates the self-interference amount of the relay device 30 based on the combination of transmission and reception of beams or panels.

Information regarding self-interference includes information on self-interference power, information on resources that receive interference, and/or information regarding a beam, and these pieces of information are reported to the parent node.

4-2. Scheduling of Uplink Backhaul Link Performed by Parent Node

The parent node that has received a report of a self-interference amount performs scheduling of an uplink backhaul link in consideration of the calculated self-interference amount. The parent node (e.g., base station device 20) can reduce the self-interference amount of a child node (e.g., relay device 30) by controlling the child node to lower uplink transmission power from the normal level.

The control of transmission power of a child node performed by a parent node can be classified into the following (a) and (b) depending on the type of a trigger. The following (a) can be rephrased as explicit signaling, and (b) can be rephrased as implicit signaling. Of course, the trigger of the control is not limited to the following.

(a) Control by Signaling Reception Regarding Transmission Power Control (Explicit Signaling)

For example, an instruction to adjust transmission power is given from a parent node to a child node by a bit field regarding transmission power control included in dynamic signaling.

(b) Control Linked With Other Control Information (Implicit Signaling)

For example, an instruction to adjust transmission power is given from the parent node to the child node in accordance with other control information (e.g., information related to in-band full duplex performed by slot format indicator (SFI)).

The following pieces of signaling of 4-2-1 to 4-2-5 can be assumed as signaling regarding transmission power control.

4-2-1. Signaling 1: UL Grant

For example, the parent node causes information regarding transmission power control to be included in uplink scheduling information (e.g., DCI). The child node adjusts transmission power by the information regarding transmission power control. For example, the child node notified to control the transmission power by the information regarding transmission power control lowers the transmission power by a predetermined amount (e.g., several dB).

An offset value for lowering the transmission power (above-described "predetermined amount") may be a fixed value (e.g., −3 dB), or a value may be set by RRC signaling. Furthermore, the offset value may be variable depending on the transmission type of an uplink (e.g., channel (PUSCH/PUCCH/physical random access channel (PRACH)/SRS) or type (e.g., eMBB or URLLC) of quality of service (QoS) of data).

4-2-2. Signaling 2: TPC Command

The parent node performs transmission power control of the child node with a TPC command (control information for transmission power control). For example, the parent node performs transmission power control of the child node by terminal common DCI like a DCI format 2_2/2_3. For example, several bits of a bitmap included in DCI are allocated to each terminal. The child node controls transmission power in accordance with the state represented by the bits.

4-2-3. Signaling 3: Slot Format Indicator

The parent node indicates resources regarding in-band full duplex by using a slot format indicator. When the slot format indicator indicates the resources regarding in-band full duplex, the child node adjusts transmission power.

4-2-4. Signaling 4: RRC Signaling

The parent node designates resources usable for in-band full duplex by RRC. When resources usable for full duplex are designated by the RRC and uplink transmission is performed by the resources, the child node adjusts transmission power.

4-2-5. Other Signaling

Signaling regarding transmission power control may be achieved by a combination of the above-described 4-2-1 to 4-2-4. For example, the signaling regarding transmission power control may be achieved by a combination of the above-described 4-2-1 and the above-described 4-2-4. When UL grant is indicated in resources indicated to be usable for the in-band full duplex, the child node adjusts transmission power.

4-3. One Example of Transmission Power Control Sequence of Uplink Backhaul Link

Figure 16:
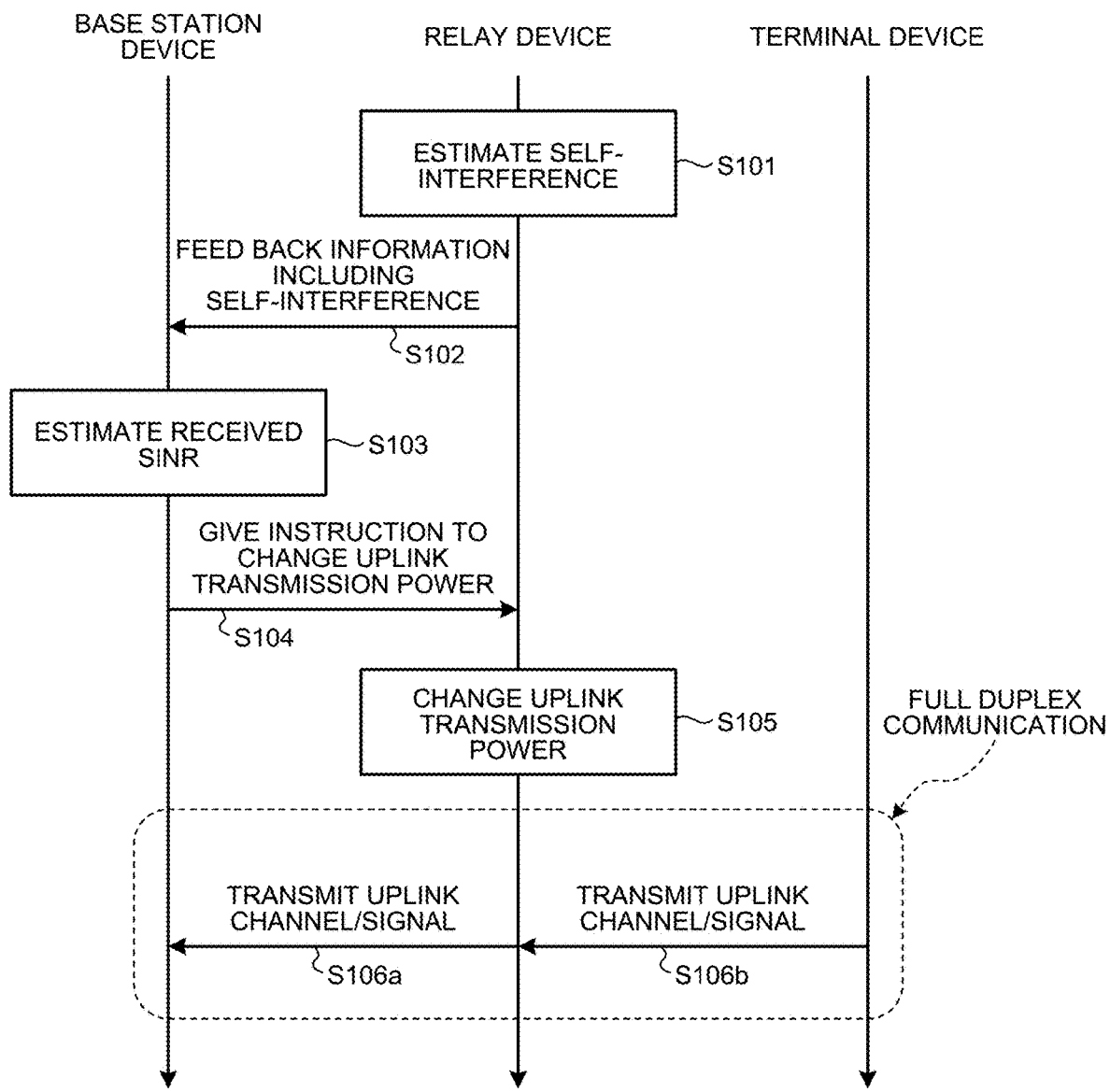
FIG. 16 illustrates one example of a transmission power control sequence of an uplink backhaul link.

FIG. 16 illustrates one example of a transmission power control sequence of an uplink backhaul link. Hereinafter, the transmission power control sequence of an uplink backhaul link will be described with reference to FIG. 16.

The generation unit 343 of the relay device 30 estimates self-interference generated at the time when in-band full duplex is performed based on information regarding self-interference (Step S101).

The acquisition unit 341 of the relay device 30 acquires the estimation result of Step S101 (hereinafter, also referred to as information on uplink test signal) as "information regarding self-interference" to be transmitted to the base station device 20. Here, the information regarding self-interference may be information on remaining power of transmission power including the information regarding self-interference (e.g., power head room), or may be channel state information including self-interference (e.g., CSI). Furthermore, the information regarding self-interference may relate to interference cancellation capability. Then, the transmission unit 345 of the relay device 30 transmits the information regarding self-interference to the base station device 20 (Step S102).

The acquisition unit 241 of the base station device 20 acquires the information regarding self-interference from the relay device 30. Then, the generation unit 243 of the base station device 20 calculates an estimated SINR of an uplink access link at the time when in-band full duplex including the self-interference is applied based on the information regarding self-interference (e.g., information on uplink test signal) (Step S103).

The generation unit 243 of the base station device 20 generates instruction information for instructing the relay device 30 to change uplink transmission power based on the estimated SINR. In order to control the uplink transmission power of the relay device 30, the communication control unit 242 of the base station device 20 transmits the instruction information generated by the generation unit 243 to the relay device 30 via the transmission unit 245 (Step S104). In this case, the communication control unit 242 (or transmission unit 245) of the base station device 20 may transmit the instruction by using a transmission power control command (e.g., TPC command), or by uplink scheduling information (e.g., DCI).

The reception unit 344 of the relay device 30 receives the instruction information from the base station device 20. Then, the communication control unit 342 of the relay device 30 changes an uplink transmission power value based on the instruction information from the base station device 20 (Step S105).

Then, the relay device 30 performs in-band full duplex. Specifically, the transmission unit 345 (or the communication control unit 342) of the relay device 30 transmits a signal/channel of the uplink backhaul link by using the changed uplink transmission power value (Step S106a). At the same time, the reception unit 344 of the relay device 30 receives the signal/channel of the uplink access link from the terminal device 40 (Step S106b).

5. Transmission Power Control Object (1) Method 2: Control Based on Determination of Child Node Itself First, a method 2 will be described. In the method 2, the relay device 30 performs transmission power control of the uplink backhaul link by the relay device 30 itself based on the information regarding self-interference. For example, in the relay device 30, transmission power of an uplink backhaul link is controlled by scheduling from a parent node (e.g., base station device 20).

5-1. Open-Loop Transmission Power Control

The relay device 30 controls transmission power by open-loop control.

In this case, the relay device 30 performs different open-loop control depending on whether the in-band full duplex is performed or not. For example, the relay device 30 separately operates open-loop control over a normal uplink that is not in the in-band full duplex and open-loop control over an uplink for the in-band full duplex. Specifically, the relay device 30 makes a difference between an open-loop uplink power control factor δ at the time when the in-band full duplex is not performed and an open-loop uplink power control factor δ for the in-band full duplex.

The following Examples 1 and 2 can be assumed as the open-loop control over an uplink for the in-band full duplex. Note that, in the following description, a parent node refers to a node that is a parent as viewed from the relay device 30. For example, the parent node is the base station device 20. Furthermore, a child node refers to a node that is a child as viewed from the relay device 30. For example, the child node is the terminal device 40.

EXAMPLE 1

The relay device 30 controls transmission power based on both of ACK/NACK information of uplink transmission to a parent node (e.g., base station device 20) and information on success/failure of reception of uplink transmission from a child node (e.g., terminal device 40). For example, when the uplink transmission to the parent node is NACK, the relay device 30 increases the transmission power of the next uplink backhaul link. When the reception of the uplink transmission from the child node has failed, the relay device 30 lowers the transmission power of the next uplink backhaul link.

EXAMPLE 2

The relay device 30 controls the transmission power based on the ACK/NACK information of the uplink transmission to the parent node (e.g., base station device 20) without using the information on success/failure of reception of the uplink transmission from the child node (e.g., terminal device 40).

EXAMPLE 3

The relay device 30 controls the transmission power based on the information on success/failure of reception of the uplink transmission from the child node (e.g., terminal device 40) without using the ACK/NACK information of the uplink transmission to the parent node (e.g., base station device 20).

5-2. Transmission Power Control Under Condition

The relay device 30 controls transmission power under a condition. For example, the relay device 30 controls the transmission power by an SINR. For example, when the estimated SINR of the uplink access link is small, the relay device 30 reduces the self-interference amount by lowering the transmission power of the uplink backhaul link. In this case, the relay device 30 may determine whether or not to consider the offset of the transmission power based on a threshold of the SINR.

5-3. One Example of Transmission Power Control Sequence of Uplink Backhaul Link

FIG. 17 illustrates one example of a transmission power control sequence of an uplink backhaul link. Hereinafter, the transmission power control sequence of an uplink backhaul link will be described with reference to FIG. 17.

The reception unit 344 of the relay device 30 receives an uplink test signal from the terminal device 40 (Step S201).

The generation unit 343 of the relay device 30 estimates a received SINR of an uplink access link including self-interference generated at the time when the in-band full duplex is performed based on the uplink test signal from the terminal device 40 (Step S202).

The acquisition unit 341 of the relay device 30 acquires the estimation result (estimation information of received SINR) in Step S202 as information regarding self-interference. The communication control unit 342 of the relay device 30 performs control (e.g., open-loop control and control by condition) of transmission power of the communication control unit 342 itself based on the information regarding self-interference. For example, the communication control unit 342 changes uplink transmission power of an uplink backhaul link based on the estimation information of the received SINR (Step S203). In this case, as described in Example 1 of <5-1. Open-Loop Transmission Power Control> above, the communication control unit 342 may perform the open-loop control based on information on the success or failure of data transmission to the base station device 20 (first communication device) and information on the success or failure of data reception from the terminal device 40 (second communication device).

Then, the relay device 30 performs in-band full duplex. Specifically, the transmission unit 345 (or the communication control unit 342) of the relay device 30 transmits a signal/channel of the uplink backhaul link by using the changed uplink transmission power value (Step S204a). At the same time, the reception unit 344 of the relay device 30 receives the signal/channel of the uplink access link from the terminal device 40 (Step S204b).

6. Transmission Power Control Object (2): Uplink Access Link

Next, transmission power control of an uplink access link will be described.

6-1. Scheduling

The relay device 30 performs scheduling of an uplink access link in consideration of a self-interference amount caused by an uplink backhaul link.

EXAMPLE 1

For example, when the self-interference amount is small (e.g., when self-interference amount is smaller than predetermined threshold), the relay device 30 performs the scheduling of an uplink access link on the resources of the uplink backhaul link so that in-band full duplex can be performed. In contrast, when the self-interference amount is large (e.g., when self-interference amount is larger than predetermined threshold), the relay device 30 does not perform the scheduling of an uplink access link on the resources of the uplink backhaul link so that in-band full duplex is avoided.

EXAMPLE 2

For example, the relay device 30 adjusts the transmission power of the uplink access link in accordance with the self-interference amount. For example, the relay device 30 performs adjustment to increase the transmission power of the uplink access link when the self-interference amount is large (e.g., when self-interference amount is larger than predetermined threshold) and to decrease the transmission power of the uplink access link when the self-interference amount is small (e.g., when self-interference amount is smaller than predetermined threshold).

Note that the control method is similar to that in the case where the transmission power control object is an uplink backhaul link.

6-2. One Example of Transmission Power Control Sequence of Uplink Access Link FIG. 18 illustrates one example of a transmission power control sequence of an uplink access link. Hereinafter, the transmission power control sequence of an uplink access link will be described with reference to FIG. 18.

The reception unit 344 of the relay device 30 receives an uplink test signal from the terminal device 40 (Step S301).

The generation unit 343 of the relay device 30 estimates a received SINR of an uplink access link including self-interference generated at the time when the in-band full duplex is performed based on the uplink test signal from the terminal device 40 (Step S302).

The acquisition unit 341 of the relay device 30 acquires the estimation result (estimation information of received SINR) in Step S302 as information regarding self-interference. The generation unit 343 of the relay device 30 generates instruction information for instructing the terminal device 40 to change uplink transmission power based on the estimated SINR. In order to control the uplink transmission power of the terminal device 40, the communication control unit 342 of the relay device 30 transmits the instruction information generated by the generation unit 343 to the terminal device 40 via the transmission unit 345 (Step S303).

The terminal device 40 changes an uplink transmission power value based on the instruction information from the relay device 30 (Step S304).

Then, the relay device 30 performs in-band full duplex. Specifically, the transmission unit 345 (or the communication control unit 342) of the relay device 30 transmits a signal/channel of the uplink backhaul link by using the changed uplink transmission power value (Step S305a). At the same time, the terminal device 40 transmits a signal/channel of the uplink access link by using the changed uplink transmission power value. The reception unit 344 of the relay device 30 receives the signal/channel of the uplink access link from the terminal device 40 (Step S305b).

7. Self-Interference from Downlink Access Link Transmission to Downlink Backhaul Link Reception Next, communication control regarding self-interference from downlink access link transmission to downlink backhaul link reception will be described. The communication control is applied to, for example, the communication control of the above-described assumed system 1A in FIG. 14.

Note that the communication control described below may be applied to the communication control of the above-described communication system 1C in FIG. 15. In this case, the downlink access link and the downlink backhaul link described below are appropriately replaced with a downlink or an uplink.

First, DL resources of an access link are assumed as resources usable for in-band full duplex.

When the relay device 30 calculates the self-interference amount, the relay device 30 can calculate the self-interference amount by using the UL resources of the backhaul link or the DL resources of the access link.

A physical downlink shared channel (PDSCH) is assumed as a transmission power control object. The transmission power of the PDSCH can be freely changed (can be changed depending on implementation).

The relay device 30, however, does not change the power of synchronization sygnals (SS)/CSI-RS. The SS/CSI-RS cannot be transmitted by the in-band full duplex. The relay device 30 tells a parent node resources unusable for the in-band full duplex. For example, the relay device 30 reports information of the DL slot and the SS/CSI-RS resources to the parent node.

8. Variations

The above-described embodiment is one example, and various modifications and applications are possible.

For example, although, in the above-described embodiment, the relay device 30 performs in-band full duplex, the communication device that performs the in-band full duplex is not limited to the relay device 30. For example, the communication device that performs the in-band full duplex may be the base station device 20. In this case, the relay device 30, the acquisition unit 341, the communication control unit 342, the generation unit 343, the reception unit 344, and the transmission unit 345 described above can be replaced with the base station device 20, the acquisition unit 241, the communication control unit 242, the generation unit 243, the reception unit 244, and the transmission unit 245. Of course, the communication device that performs the in-band full duplex may be the terminal device 40.

Furthermore, when the communication device performs control regarding the data transmission based on information from another device (information processing device) generated based on information regarding self-interference, the other device is not limited to the base station device 20. For example, the other device (information processing device) may be the management device 10, the relay device 30, or the terminal device 40.

A control device that controls the management device 10, the base station device 20, the relay device 30, or the terminal device 40 of the embodiment may be implemented by a dedicated computer system or a general-purpose computer system.

For example, a communication program for executing the above-described operation (e.g., transmission/reception processing) is stored in a computer-readable recording medium such as an optical disk, a semiconductor memory, a magnetic tape, and a flexible disk, and distributed. Then, for example, the program is installed in a computer, and the above-described processing is executed to constitute a control device. In this case, the control device may be a device (e.g., personal computer) outside the base station device 20, the relay device 30, or the terminal device 40. Furthermore, the control device may be a device (e.g., control unit 24, control unit 34, or control unit 45) inside the base station device 20, the relay device 30, or the terminal device 40.

Furthermore, the above-described communication program may be stored in a disk device of a server device on a network such as the Internet so that the communication program can be, for example, downloaded to a computer. Furthermore, the above-described functions may be implemented by cooperation of an operating system (OS) and application software. In this case, a portion other than the OS may be stored in a medium and distributed, or the portion other than the OS may be stored in a server device so that the portion can be, for example, downloaded to a computer.

Furthermore, among pieces of processing described in the above-described embodiment, all or part of processing described as being performed automatically can be performed manually, or all or part of processing described as being performed manually can be performed automatically by a known method. In addition, the processing procedure, specific name, and information including various pieces of data and parameters in the above document and drawings can be optionally changed unless otherwise specified. For example, various pieces of information in each figure are not limited to the illustrated information.

Furthermore, each component of each illustrated device is functional and conceptual, and does not necessarily need to be physically configured as described. That is, the specific form of distribution/integration of each device is not limited to the illustrated form, and all or part of the device can be configured in a functionally or physically distributed/integrated manner in any unit in accordance with various loads and usage situations.

Furthermore, the above-described embodiment can be appropriately combined in a region where the processing contents do not contradict each other. Furthermore, the order of steps in the flowcharts the flowcharts or the sequence diagrams of the above-described embodiment can be appropriately changed.

Furthermore, for example, the embodiment can be carried out as any configuration constituting a device or a system, for example, a processor serving as a system large scale integration (LSI) or the like, a module using a plurality of processors or the like, a unit using a plurality of modules or the like, a set obtained by further adding other functions to the unit (i.e., configuration of part of device), and the like.

Note that, in the embodiment, a system means a set of a plurality of components (e.g., devices and modules (parts)), and it does not matter whether or not all the components are in the same housing. Thus, a plurality of devices housed in separate housings and connected via a network and one device in which a plurality of modules is housed in one housing are both systems.

Furthermore, for example, the embodiment can adopt a configuration of cloud computing in which one function is shared and processed by a plurality of devices in cooperation via a network.

9. Conclusion

As described above, according to one embodiment of the present disclosure, the communication device (e.g., relay device 30) can simultaneously perform data transmission and data reception by using the same band. The communication device acquires information regarding self-interference generated at the time when data transmission and data reception are simultaneously performed by using the same band, and performs control regarding the data transmission based on the information regarding self-interference. Alternatively, the communication device performs control regarding data transmission based on information from another device (e.g., base station device 20) generated based on the information regarding self-interference.

As a result, the communication device can achieve simultaneous transmission (e.g., in-band full duplex) of data transmission and data reception using the same band with high quality. As a result, the communication device can achieve high communication performance.

Although the embodiment of the present disclosure has been described above, the technical scope of the present disclosure is not limited to the above-described embodiment as it is, and various modifications can be made without departing from the gist of the present disclosure. Furthermore, components of different embodiments and variations may be appropriately combined.

Furthermore, the effects in the embodiment described in the specification are merely examples and not limitations. Other effects may be exhibited.

Note that the present technology may also have the configurations as follows.

(1)

A communication device comprising:

a communication unit that is allowed to simultaneously perform data transmission and data reception by using a same band;

an acquisition unit that acquires information regarding self-interference generated at a time when the data transmission and the data reception are simultaneously performed by using the same band; and a communication control unit that performs control regarding the data transmission based on information regarding the self-interference or information from another device generated based on the information regarding the self-interference.

(2)

The communication device according to (1), wherein the communication control unit controls at least transmission power of the data transmission based on information regarding the self-interference or the information from the other device generated based on information regarding the self-interference.

(3)

The communication device according to (1) or (2), wherein the communication control unit controls at least beamforming of the data transmission based on information regarding the self-interference or the information from the other device generated based on information regarding the self-interference.

(4)

The communication device according to any one of (1) to (3), further comprising:

a transmission unit that transmits information regarding the self-interference to the other device; and a reception unit that receives an instruction regarding the data transmission from the other device, the instruction being generated based on information regarding the self-interference, wherein the communication control unit performs control regarding the data transmission based on the instruction received from the other device.

(5)

The communication device according to (4), wherein the transmission unit transmits information on remaining power of transmission power, which has been corrected based on an interference amount of the self-interference, as information regarding the self-interference, the reception unit receives an instruction regarding transmission power of the data transmission from the other device, the instruction being generated based on information regarding the self-interference, and the communication control unit controls transmission power of the data transmission based on the instruction that has been received from the other device.

(6)

The communication device according to (4), wherein the transmission unit transmits channel state information including information on the interference amount of the self-interference as information regarding the self-interference, the reception unit receives the instruction that has been generated based on the channel state information, and the communication control unit performs control regarding the data transmission based on the instruction that has been received from the other device.

(7)

The communication device according to (4), wherein the transmission unit transmits information on interference cancellation capability as information regarding the self-interference, the reception unit receives the instruction that has been generated based on the information on the interference cancellation capability, and the communication control unit performs control regarding the data transmission based on the instruction that has been received from the other device.

(8)

The communication device according to any one of (4) to (7), wherein the other device is a base station device, and an instruction regarding the data transmission is transmitted by uplink scheduling information from the base station device.

(9)

The communication device according to any one of (4) to (7), wherein the other device is a base station device, and an instruction regarding the data transmission is a transmission power control (TPC) command transmitted from the base station device.

(10)

The communication device according to (1), wherein the communication control unit performs open-loop control regarding the data transmission based on information regarding the self-interference.

(11)

The communication device according to (10), wherein the communication control unit performs different open-loop control depending on whether the data transmission and the data reception are simultaneously performed by using the same band or not.

(12)

The communication device according to (10) or (11), wherein the communication unit is allowed to simultaneously perform the data transmission to a first communication device and the data reception from a second communication device different from the first communication device by using a same band, and the communication control unit performs the open-loop control based on information on success or failure of the data transmission to the first communication device and information on success or failure of the data reception from the second communication device.

(13)

An information processing device comprising:

an acquisition unit that acquires information regarding self-interference of a communication device generated at a time when the communication device, which is allowed to simultaneously perform data transmission and data reception by using a same band, simultaneously performs the data transmission and the data reception by using the same band; and a communication control unit that performs control regarding the data transmission of the communication device based on information regarding the self-interference.

(14)

The information processing device according to (13), further comprising:

a reception unit that acquires information regarding the self-interference from the communication device; and a generation unit that generates an instruction regarding the data transmission of the communication device based on information regarding the self-interference, wherein the communication control unit controls the data transmission of the communication device based on the generated instruction.

(15)

The information processing device according to (14), wherein the acquisition unit acquires information on interference cancellation capability of the communication device as information regarding the self-interference, and the generation unit generates an instruction regarding the data transmission of the communication device based on the information on the interference cancellation capability.

(16)

The information processing device according to (15), wherein the generation unit estimates an interference amount of the self-interference of the communication device based on information on transmission power of the data transmission of the communication device and information on the interference cancellation capability of the communication device, and generates the instruction to the communication device based on the estimated interference amount.

(17)

The information processing device according to any one of (13) to (16), wherein the communication control unit controls at least transmission power of the data transmission of the communication device based on information regarding the self-interference of the communication device.

(18)

The information processing device according to any one of (13) to (17), wherein the communication control unit controls at least beamforming of the data transmission based on information regarding the self-interference.

(19)

A communication method comprising:

acquiring information regarding self-interference generated at a time when a communication unit, which is allowed to simultaneously perform data transmission and data reception by using a same band, simultaneously performs the data transmission and the data reception by using the same band; and performing control regarding the data transmission based on information regarding the self-interference or information from another device based on the information regarding the self-interference.

(20)

An information processing method comprising:

acquiring information regarding self-interference of a communication device generated at a time when the communication device, which is allowed to simultaneously perform data transmission and data reception by using a same band, simultaneously performs the data transmission and the data reception by using the same band; and performing control regarding the data transmission of the communication device based on information regarding the self-interference.

(21)

A communication program for causing a computer to function as:

a communication unit that is allowed to simultaneously perform data transmission and data reception by using a same band;

an acquisition unit that acquires information regarding self-interference generated at a time when the data transmission and the data reception are simultaneously performed by using the same band; and a communication control unit that performs control regarding the data transmission based on information regarding the self-interference or information from another device generated based on the information regarding the self-interference.

(22)

An information processing program for causing a computer to function as:

an acquisition unit that acquires information regarding self-interference of a communication device generated at a time when the communication device, which is allowed to simultaneously perform data transmission and data reception by using a same band, simultaneously performs the data transmission and the data reception by using the same band; and a communication control unit that performs control regarding the data transmission of the communication device based on information regarding the self-interference.

REFERENCE SIGNS LIST

1 Communication System
10 Management Device
20 Base Station Device
30 Relay Device
40 Terminal Device
11 Communication Unit
21, 31, 41 Communication Unit
12, 22, 32, 42 Storage Unit
13, 24, 34, 45 Control Unit
23, 33, 43 Upper Layer Processing Unit
44 Input/Output Unit
211, 311, 411 Reception Processing Unit
211a, 311a, 411a Radio Reception Unit
211b, 311b, 411b Demultiplexing Unit
211c, 311c, 411c Demodulation Unit
211d, 311d, 411d Decoding Unit
311e, 411e Channel Measurement Unit
212, 312, 412 Transmission Processing Unit
212a, 312a, 412a Encoding Unit
212b, 312b, 412b Modulation Unit
212c, 312c, 412c Multiplexing Unit
212d, 312d, 412d Radio Transmission Unit
312e Downlink Reference Signal Generation Unit
412e Uplink Reference Signal Generation Unit
213, 313, 413 Self-Canceller Unit
214, 314, 414 Antenna
241, 341 Acquisition Unit
242, 342 Communication Control Unit
243, 343 Generation Unit
244, 344 Reception Unit
245, 345 Transmission Unit

The invention claimed is:

1. A communication device comprising:
a communication circuit configured to simultaneously perform data transmission and data reception by using a same band;
control circuitry that:
acquires information regarding self-interference that is generated by the communication device at a time when the data transmission and the data reception are simultaneously performed by using the same band; and
performs control regarding the data transmission based on the information regarding the self-interference,
wherein the communication circuit:
transmits the information regarding the self-interference to a second device; and
receives an instruction regarding the data transmission from the second device,
the instruction being generated based on the information regarding the self-interference,
wherein the control circuitry performs the control regarding the data transmission based on the instruction received from the second device,
wherein the information regarding the self-interference comprises channel state information that includes information on an interference amount of the self-interference,
wherein the instruction comprises an instruction that has been generated based on the channel state information.

2. The communication device according to claim 1, wherein the instruction includes an instruction for controlling at least transmission power of the data transmission of the communication device.

3. The communication device according to claim 1,
wherein the instruction includes an instruction for controlling at least beamforming of the data transmission.

4. The communication device according to claim 1,
wherein the information regarding the self-interference further comprises information on a remaining power of a transmission power of the communication device, which has been corrected based on the interference amount of the self-interference.

5. The communication device according to claim 1,
wherein the information regarding the self-interference further comprises information on an interference cancellation capability of the communication device.

6. The communication device according to claim 1,
wherein the second device is a base station device, and
an instruction regarding the data transmission is transmitted by uplink scheduling information from the base station device.

7. The communication device according to claim 1,
wherein the second device is a base station device, and
an instruction regarding the data transmission is a transmission power control (TPC) command transmitted from the base station device.

8. The communication device according to claim 1,
wherein the control circuitry performs open-loop control regarding the data transmission based on the information regarding the self-interference.

9. The communication device according to claim 8,
wherein the control circuitry performs different open-loop control depending on whether the data transmission and the data reception are simultaneously performed by using the same band or not.

10. The communication device according to claim 8,
wherein the communication circuit is configured to simultaneously perform the data transmission to a first communication device and the data reception from a second communication device different from the first communication device by using a same band, and
the control circuitry performs the open-loop control based on information on a success or failure of the data transmission to the first communication device and information on success or failure of the data reception from the second communication device.

11. An information processing device comprising:
control circuitry that:
acquires, from a communication device, information regarding self-interference of the communication device that is generated at a time when the communication device, which is configured to simultaneously perform data transmission and data reception by using a same band, simultaneously performs the data transmission and the data reception by using the same band; and
performs control regarding the data transmission of the communication device based on the information regarding the self-interference;
wherein the communication circuit:
receives the information regarding the self-interference from the communication device; and
transmits an instruction regarding the data transmission to the communication device, the instruction being generated based on the information regarding the self-interference,
wherein the communication device performs the control regarding the data transmission based on the transmitted instruction,
wherein the information regarding the self-interference comprises channel state information that includes information on an interference amount of the self-interference,
wherein the instruction comprises an instruction that has been generated based on the channel state information.

12. The information processing device according to claim 11,
wherein the information regarding the self-interference further comprises information on an interference cancellation capability of the communication device.

13. The information processing device according to claim 11,
wherein the information regarding the self-interference further comprises information on a remaining power of a transmission power of the communication device, which has been corrected based on the interference amount of the self-interference.

14. The information processing device according to claim 11,
wherein the instruction includes an instruction for controlling at least transmission power of the data transmission of the communication device.

15. The information processing device according to claim 11,
wherein the instruction includes an instruction for controlling at least beamforming of the data transmission.

16. A communication method performed by a communication device that includes communication circuit configured to simultaneously perform data transmission and data reception by using a same band, the method comprising:
acquiring information regarding self-interference that is generated at a time when the data transmission and the data reception are simultaneously performed by using the same band; and
performing control regarding the data transmission based on the information regarding the self-interference,
wherein the method further comprises:
transmitting the information regarding the self-interference to a second device; and
receiving an instruction regarding the data transmission from the second device,
the instruction being generated based on the information regarding the self-interference,
performing the control regarding the data transmission based on the received instruction,
wherein the information regarding the self-interference comprises channel state information that includes information on an interference amount of the self-interference,
wherein the instruction comprises an instruction that has been generated based on the channel state information.

17. An information processing method performed by an information processing device and comprising:
acquiring, from a communication device, information regarding self-interference of the communication device that is generated at a time when the communication device, which is configured to simultaneously perform data transmission and data reception by using a same band, simultaneously performs the data transmission and the data reception by using the same band; and
performing control regarding the data transmission of the communication device based on the information regarding the self-interference, wherein the method further comprises:
- receiving the information regarding the self-interference from the communication device; and
- transmitting an instruction regarding the data transmission to the communication device, the instruction being generated based on the information regarding the self-interference, wherein the communication device performs the control regarding the data transmission based on the transmitted instruction, wherein the information regarding the self-interference comprises channel state information that includes information on an interference amount of the self-interference, wherein the instruction comprises an instruction that has been generated based on the channel state information.

* * * * *